June 6, 1961 K. S. DUNLAP 2,987,579
CROSSPOINT SWITCHING NETWORK CONTROL SYSTEM
Filed July 18, 1957 10 Sheets-Sheet 3

INVENTOR
K. S. DUNLAP
BY
ATTORNEY

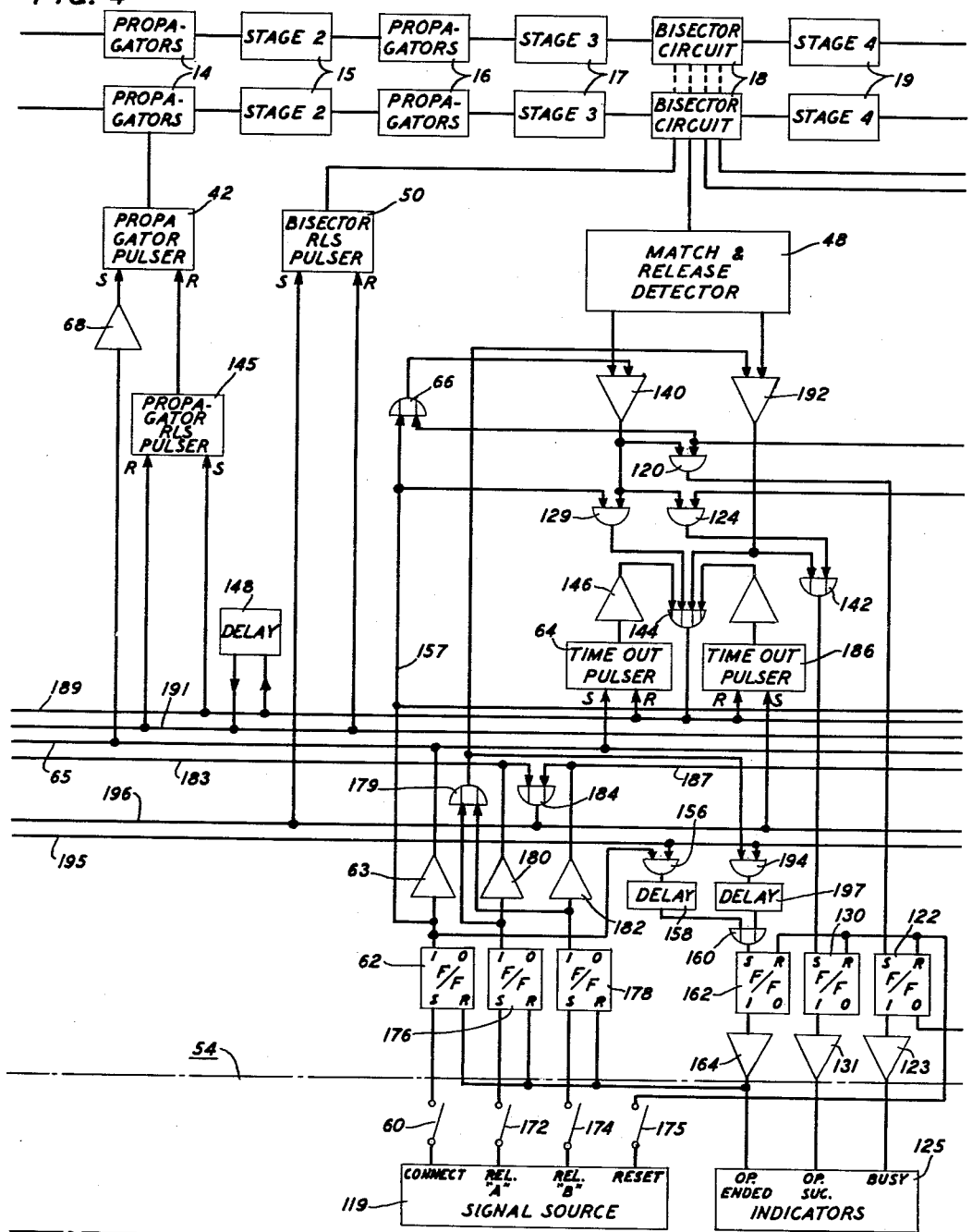

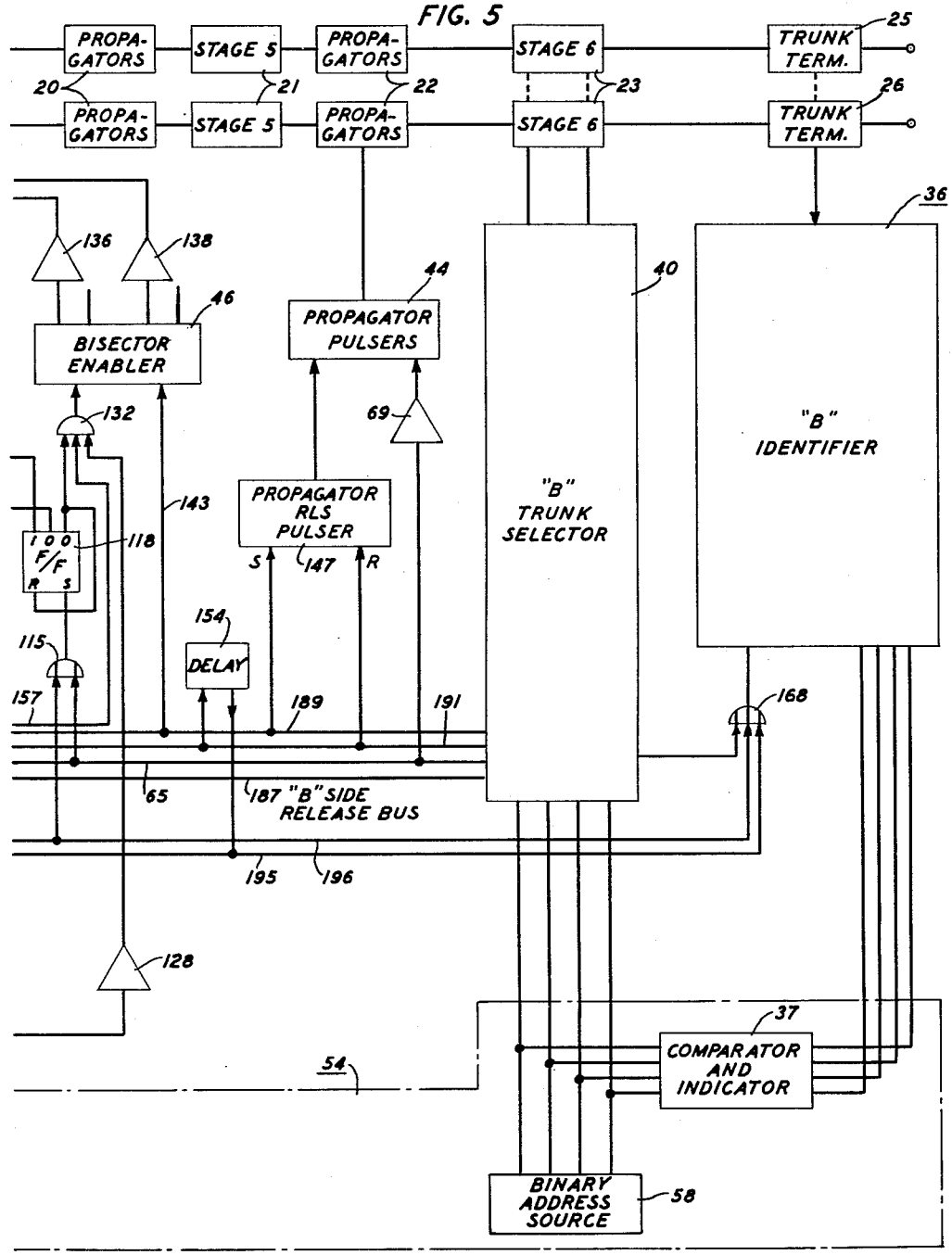

June 6, 1961  K. S. DUNLAP  2,987,579
CROSSPOINT SWITCHING NETWORK CONTROL SYSTEM
Filed July 18, 1957  10 Sheets-Sheet 6

INVENTOR
K. S. DUNLAP
BY
ATTORNEY

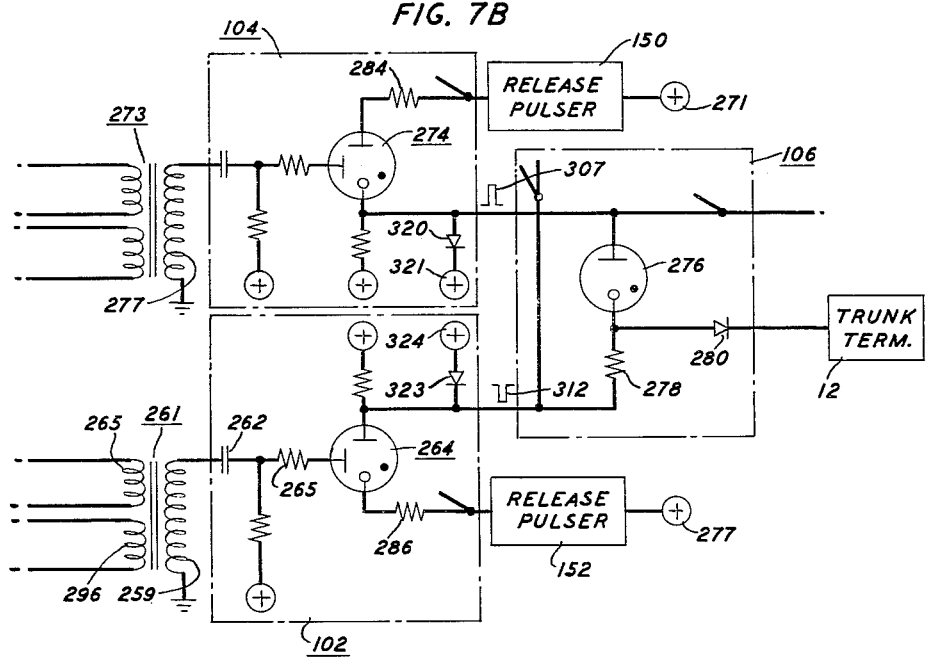
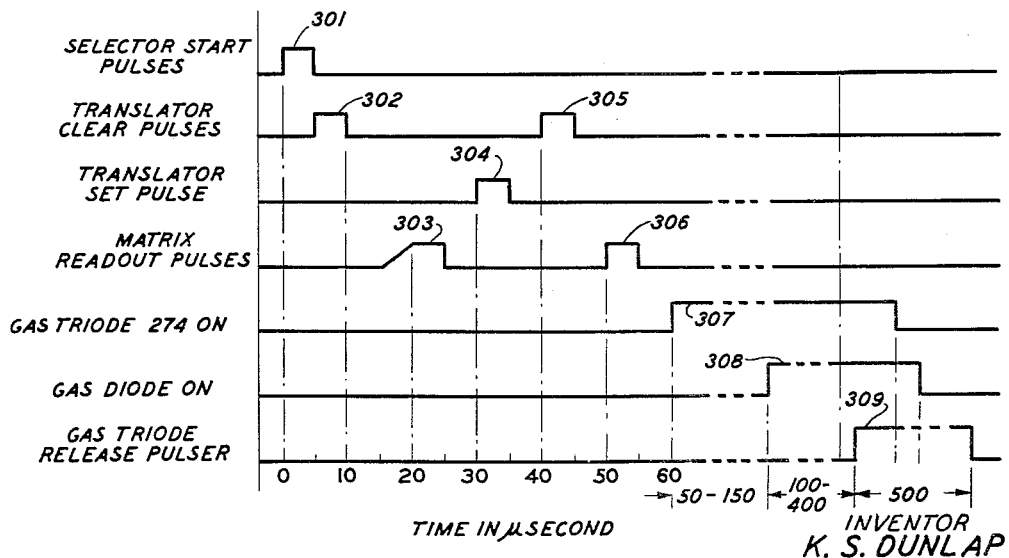

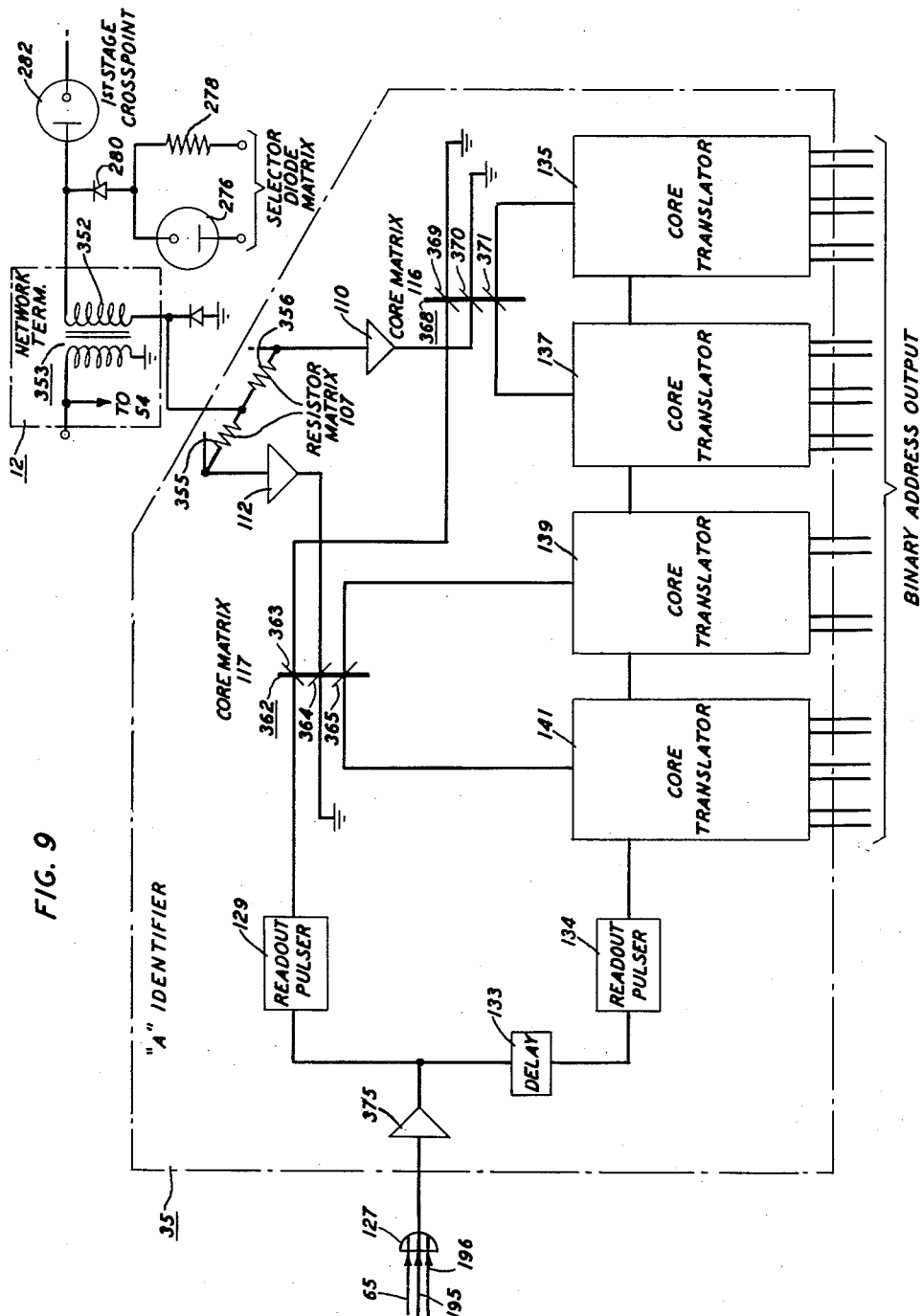

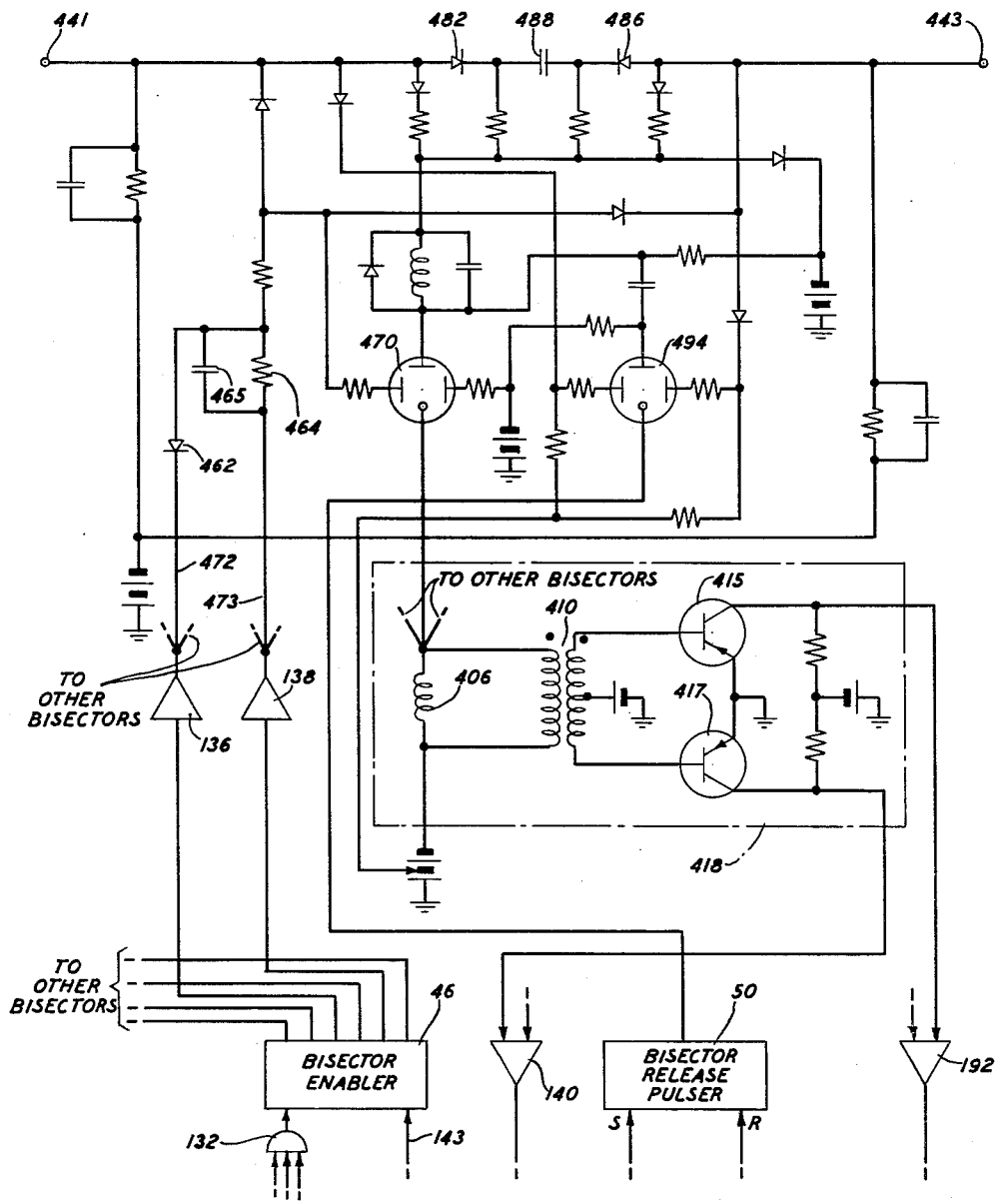

United States Patent Office 2,987,579
Patented June 6, 1961

2,987,579
CROSSPOINT SWITCHING NETWORK CONTROL SYSTEM
Kermit S. Dunlap, Madison, N.J., assignor to Bell Telephone Laboratories, Incorporated, New York, N.Y., a corporation of New York
Filed July 18, 1957, Ser. No. 672,651
30 Claims. (Cl. 179—18)

This invention relates to communication switching networks and more particularly to such networks as employed in telephone switching systems utilizing crosspoint devices.

Switching networks are known which contain a large number of interconnected gas tubes as the crosspoint devices of a network, which tubes may be rendered conductive selectively to establish paths between predetermined input and output terminals. Such a network is fully described in Patent 2,684,405, issued July 20, 1954, of E. Bruce and H. M. Straube, which patent also discloses the supervisory and other circuits for recognition of the condition of subscribers' lines and trunks and for manually accomplishing the necessary switching in response thereto. Another switching network containing crosspoint devices is disclosed in B. G. Bjornson and E. Bruce application Serial No. 334,552, filed February 2, 1953, now United States Patent 2,876,285, issued March 3, 1959. As therein disclosed, the crosspoint devices are transistors which are connected to operate as bilateral devices. Here also supervisory and other circuits are disclosed for recognition of the condition of subscribers' lines and for manually accomplishing the necessary switching in response thereto.

Priorly, it has also been proposed that these networks employ propagator circuits, either active or passive, connected intermediate the network for controlling the generation of new marking pulses within the network to insure faultless establishment of a transmission path through the network. Examples of active propagator circuits are disclosed in application Serial No. 426,338, filed April 29, 1954, of R. W. Ketchledge, now United States Patent 2,859,282, issued April 21, 1959, and application Serial No. 617,060, filed October 19, 1956, of K. S. Dunlap and J. P. Taylor, now United States Patent 2,859,282, issued Nov. 4, 1958. An example of a passive type propagator circuit is disclosed in R. W. Ketchledge application Serial No. 617,189, filed October 19, 1956, now United States Patent 2,859,284, issued Nov. 4, 1958. The principal distinctions between these active and passive propagators are that the active propagator contains active elements such as gaseous diodes or gaseous triodes; in order to activate the gaseous propagator tube, it is necessary to apply an enabling pulse. The passive propagator circuits contain only passive elements such as resistors, condensers, and semiconductor diodes and do not require the application of an enabling pulse but are controlled solely by the receipt of a marking pulse from the preceding stage and in response to this marking pulse deliver a new marking pulse to the subsequent stage of crosspoints.

Bisector or junctor circuits may also be connected intermediate such crosspoint networks. One of the functions of these circuits is to isolate the electrical variations on either side of the bisector circuit. By the use of these bisector circuits, it is possible to increase the number of stages of crosspoints which may be connected in tandem without incurring false cross connections within the network. The simplest form of these bisector circuits is a back-biased diode as disclosed in my application Serial No. 617,087, filed October 19, 1956, now United States Patent 2,859,283, issued Nov. 4, 1958. Another example of a bisector circuit is disclosed in application Serial No. 617,131, filed October 19, 1956, of G. E. Jacoby and J. W. Rieke, now United States Patent 2,883,470, issued April 21, 1959.

The Jacoby-Rieke bisector is symmetrical in that it applies the same voltages and presents the same impedances to the crosspoint devices on either side of the bisector. A symmetrical bisector permits the crosspoint devices to be arranged symmetrically about the bisector. For example, the anodes of both the preceding and the subsequent crosspoint gas diodes may be connected to the bisector.

In the prior switching networks employing propagators and bisectors, as described in the above-mentioned patent and applications, the sequences of operations within the network have generally been manually controlled. Further, these networks employ network control circuits requiring the operation of a number of switches in order to accomplish either a connect or a disconnect operation. These networks do not include circuitry for determining faulty conditions within the network or for restoring the network to its quiescent condition should such a faulty condition occur. The term "network control circuit," as herein employed, designates that portion of the distribution network which is common to all the crosspoint devices.

Accordingly, it is an object of this invention to provide an improved crosspoint switching network control circuit.

It is another object of this invention to provide improved network control circuitry to control the sequence of operation within a crosspoint distribution network for the establishment of transmission paths and more specifically to control the establishment and disestablishment of communication paths in a minimum time.

It is another object of this invention to provide a crosspoint switching network control circuit which is automatically restored to a normal or quiescent condition after each connect or disconnect operation in the network, whether that operation is successfully completed or not, thus permitting the network control circuit to be utilized repeatedly for the establishment and disestablishment of transmission paths through the network.

It is another object of this invention to provide self-checking sequences of operations for a crosspoint switching network control circuit.

Other objects of this invention are to provide an improved crosspoint switching network control circuit which delivers binary addresses to verify the network terminals whenever a mark, a disconnect, or a tracing pulse is applied to the network terminal; which tests each selected network terminal to determine if that terminal is busy and which then delivers an indication of a busy terminal encountered in a connect operation; which controls the establishment of a communication path through the network between two predetermined terminals in response to the application of a pair of binary addresses and a connect order pulse; which controls the release of a network transmission path in response to a release order pulse and a binary address, which binary address is indicative of one of the network terminals in the established path; and which tests the selected network terminal of an established communication path to determine if that terminal is busy and which releases the path only if this condition is met.

It is another object of this invention to provide a crosspoint network control circuit which delivers various signals to an office control switchboard or circuit indicative of the various operations of the network, such as a successful or an unsuccessful connect or disconnect operation, or faulty operation within the control circuit or within the distribution network.

Briefly, in accordance with certain aspects of this invention, a crosspoint switching network, such as disclosed in the above-mentioned E. Bruce and H. M. Straube patent, my application Serial No. 617,087, filed October 19, 1956, now United States Patent 2,859,283, issued November 4, 1958, and Jacoby-Rieke application Serial No. 617,131, filed October 19, 1956, now United States Patent 2,883,470, issued April 21, 1959, is provided with electronic control circuitry including logic and timing circuitry which controls the sequence of operation throughout the network in response to connect or disconnect order pulses and further provides for clearing the control circuitry if either the connect or disconnect operation is unsuccessful. Also, this control circuitry includes logic circuitry which provides certain indications of successful or unsuccessful operations, as well as indications of faulty operation within either the network itself or the control circuitry. The switching or distribution network itself includes both active propagator and bisector circuits.

In one specific embodiment of this invention, the control circuitry includes trunk selector circuits, logic circuitry, and pulsing or signal circuits to apply control signals to the logic circuitry and selector circuits. A connect operation is initiated within the crosspoint network by supplying three electrical signals to the network control circuit. Terminal addresses, in binary form, are applied to the selector circuits associated with opposite terminals of the network, and a connect order pulse is applied to the logic circuitry. The connect order pulse causes a selector operation initiating pulse to be applied through the logic circuitry to each of the trunk selectors. In response to this initiating pulse, the selectors apply marking pulses to the two network terminals, the particular terminals being predetermined by the binary addresses.

Identifier circuits are connected to the logic circuitry and to the network terminals to receive pulses from the network terminal and to deliver a binary address indicative of the particular terminal pulsed. Pulses may be applied to a predetermined network terminal from the adjacent trunk selector during a connect or disconnect operation. A tracing pulse is applied to the network terminal from the opposite network terminal through an established path when a disconnect pulse is applied to the opposite terminal. This tracing pulse will also actuate one of the identifier circuits.

Delay circuitry is connected to the logic circuitry to control the sequence of application of pulses to the network and to control the sequence of delivery of pulses from the network. This delay circuitry may include flip-flops, integrating circuits, and threshold amplifiers.

In accordance with aspects of this invention, the logic circuitry includes two gated amplifiers to which enabling pulses must be applied by the connect and disconnect order pulse circuits, respectively, before a signal may be transmitted through one of these amplifiers. Advantageously, these gated amplifiers are connected between a bisector match detector and the network condition-indicating circuitry and between a bisector release detector and the network condition-indicating circuitry. The gated amplifiers thus control the delivery of pulses to other portions of the control circuitry only if a connect order signal or a release order signal has been applied to the control circuitry.

The control circuitry includes busy test circuitry which controls the operation of certain of the logic circuitry to turn off the control circuitry if, in the operation of the connect sequence, the new marking signal causes a cross connection between the path being established and a priorly established path. Further, the busy test circuitry controls certain other portions of the logic circuitry to prevent the application of enabling pulses to the network bisector circuits until after the busy check has been completed.

The control circuit releases an established path through the network in response to two signals, namely, the binary address of either terminal of the established path to be disconnected and the release order pulse. The binary address is applied to the selector on that side of the network to which a disconnect pulse is to be applied. The disconnect order pulse is applied through the logic circuitry to control the application of a pulse to the selected network terminal and also progresses through the logic circuitry to control the application of a release pulse to the bisector circuits. Further, when the release operation is completed, a pulse is delivered from the release detector circuit through the logic circuitry to indicate a successful release operation.

In accordance with still other aspects of this invention, the control circuitry includes a connect order time-out pulser and a release order time-out pulser, which pulsers are set by a connect order pulse and a release order pulse, respectively. If the connect or the release operation cannot be successfully effected within predetermined periods, the particular time-out pulser which was set or turned on will deliver a turn-off signal to the logic circuitry and in so doing will automatically return to its initial condition. This turn-off signal restores the control circuit to its quiescent condition. Further, the control circuitry includes logic circuitry and delay circuitry, which logic and delay circuitry control the delivery of electrical condition-indicating signals from the time-out pulsers in a manner to permit the selector and identifier circuits to be sequentially cleared of any information stored therein.

Accordingly, it is a feature of this invention to provide a crosspoint distribution network control circuit which employs logic circuitry to control the application of mark, enabling, disconnect, and disabling pulses to the crosspoints and control circuit and thus to control the establishment and disestablishment of transmission paths through the network.

It is another feature of this invention to employ a crosspoint distribution network control circuit including logic and delay circuitry to control the sequences of connect and disconnect operations in the crosspoint network.

It is another feature of this invention to employ trunk selectors and trunk identifiers connected to the logic circuitry and associated with the respective terminals of a crosspoint network to control the selection and identification of the terminals of the crosspoint network in response to control pulses delivered through the logic circuitry.

It is another feature of this invention to employ, in connection with a crosspoint switching network having propagator circuits and bisector circuits, a control circuit including AND and OR gates to control the sequences of application of pulses to the propagator circuits and to the bisector circuits as well as to control the delivery of condition-indicating pulses from the bisector circuits.

It is a further feature of this invention to employ, in a crosspoint network control circuit, time-out pulsers which restore the control circuit to a normal or quiescent condition if either the connect or disconnect sequence cannot be successfully completed.

It is a further feature of this invention to provide a crosspoint distribution network control circuit with two sources of binary addresses connected to logic circuitry and to determine which two terminals of the network are to be selected for the establishment of a communication path, the logic circuitry controlling the sequence of the terminal selection operation.

It is a still further feature of this invention to connect a connect order pulse source to the logic circuitry of the network control circuit and to start the terminal selection operation by applying a connect order pulse to the logic circuitry.

It is another feature of this invention to connect an operation-ended indicating circuit in a crosspoint network control circuit through logic circuitry in such a manner that the indicating circuit will receive a signal only after a connect or a disconnect sequence has terminated.

It is another feature of this invention to connect an operation-successful indicating circuit to a network control circuit through logic circuitry to receive a signal only after a connect or a disconnect sequence had been successfully completed.

It is still another feature of this invention to connect a busy indicating circuit through logic circuitry to receive a signal from the logic circuitry only if, in marking a new path or releasing an established path, a busy circuit is pulsed by the control circuitry.

It is another feature of this invention to connect logic circuitry in a crosspoint switching network control circuit between the bisector enabling pulser and a connect order pulse source to control the actuation of this bisector enabling pulser in response to a connect order pulse only if neither of the selected terminals is busy.

The foregoing and other objects and features of this invention may be more readily understood from the following description when read with reference to the attached drawing in which:

FIG. 1 is a block diagram of a portion of a crosspoint distribution network and a network control circuit in accordance with one specific illustrative embodiment of this invention;

FIGS. 2, 3, 4, and 5, when placed side by side in accordance with the key of FIG. 6, depict in detail the distribution network and the network control circuitry of the embodiment of FIG. 1;

FIGS. 7A and 7B depict, in combined block and schematic form, certain portions of one of the selector circuits of the embodiment of FIG. 1, together with binary address circuitry for selecting a predetermined network terminal;

FIG. 8 depicts time plots of various pulses which occur in the selector circuits;

FIG. 9 depicts, in combined block and schematic form, one of the identifier circuits and certain portions of the network circuitry and network control circuitry of the embodiment of FIG. 1;

FIG. 10 is a schematic representation of a bisector circuit as disclosed in the above-mentioned Jacoby-Rieke application and which may advantageously be employed in networks in accordance with my invention.

Figure 1:
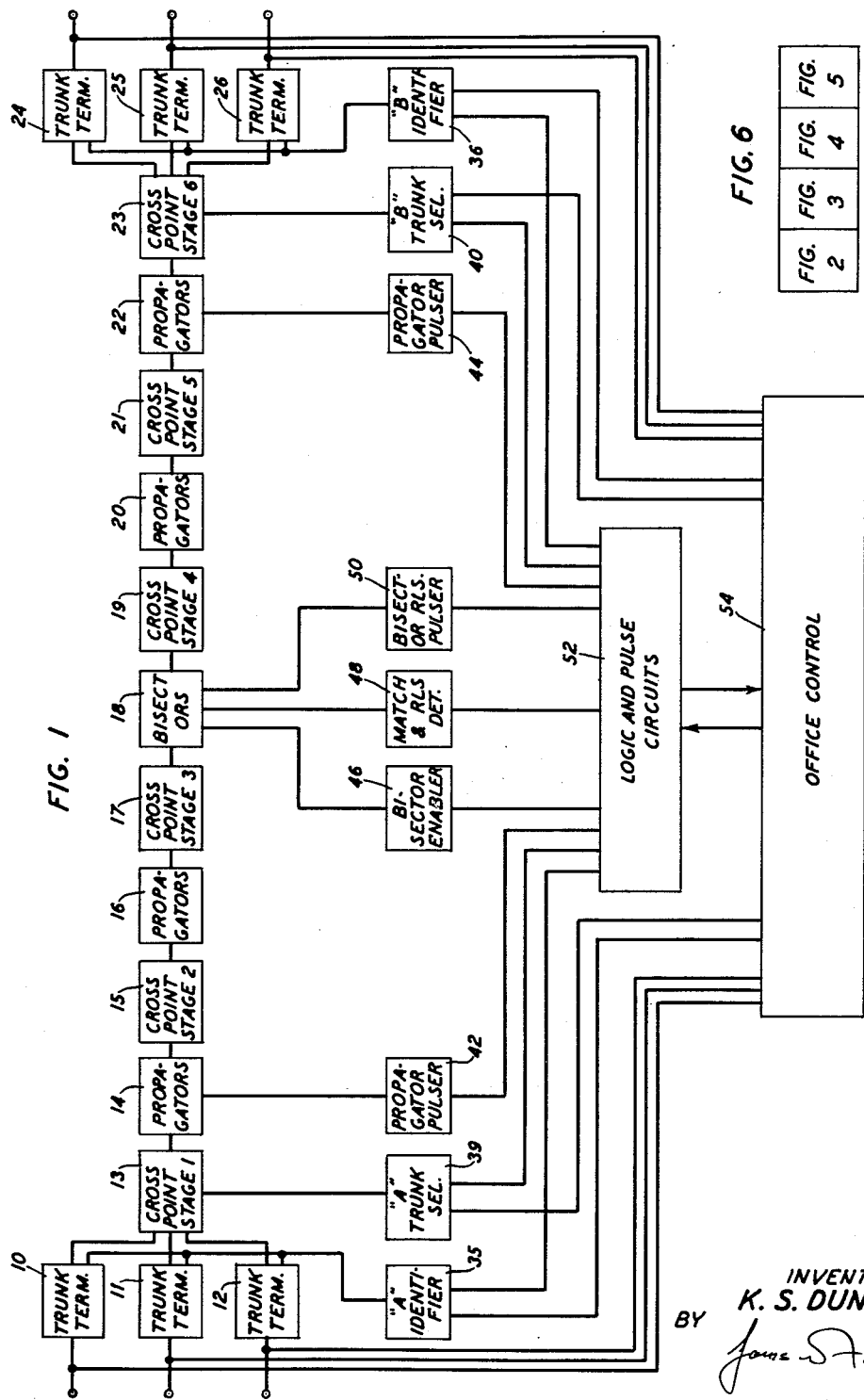

Referring now to FIG. 1, there is depicted in block diagram form a portion of a crosspoint distribution network and the network control circuit in accordance with my invention. Terminals 10, 11, and 12 are shown on the left-hand or A side of the network. These terminals are connected to the first stage 13 of crosspoint devices in the network. These crosspoint devices may be transistors or they may be gas discharge devices such as diodes. These diodes may be of the types disclosed in applications Serial Nos. 169,121, filed June 20, 1950, of M. A. Townsend, now United States Patent 2,804,565, issued August 27, 1957; 583,671, filed May 9, 1956, of A. D. White, now United States Patent 2,926,277, issued Feb. 23, 1960; and 583,665, filed May 9, 1956, of R. L. Mueller and W. G. Stieritz, now United States Patent 2,899,588, issued August 11, 1959.

Propagators 14 are connected between the first stage of crosspoints 13 and the second stage of crosspoints 15. These propagators are of the active type which were previously discussed. Passive type propagators 16 are connected between second stage crosspoints 15 and third stage crosspoints 17. Bisectors 18 are connected between the third stage of crosspoints 17 and the fourth stage of crosspoints 19. Advantageously, these bisectors are of the symmetrical type such as disclosed in application Serial No. 617,131, filed October 19, 1956, by G. E. Jacoby and J. W. Rieke, now United States Patent 2,883,470, issued April 21, 1959. Additional passive propagator circuits 20 are connected between the fourth and fifth stages of crosspoints 19 and 21, respectively. Additional active propagator circuits 22 are connected between fifth stage crosspoints 21 and sixth stage crosspoints 23. "B" terminals 24, 25, and 26 are connected to the sixth stage of crosspoints.

A transmission path is established between one of the terminals on the A side and one of the terminals on the B side through the crosspoints, propagators, and a bisector circuit by the application of control pulses from the network control circuit. The network control circuitry includes all of the network not included in the communication paths. The control circuitry includes identifiers, trunk or terminal selectors, pulsers, detectors, logic circuitry, and the office control.

Figure 11:
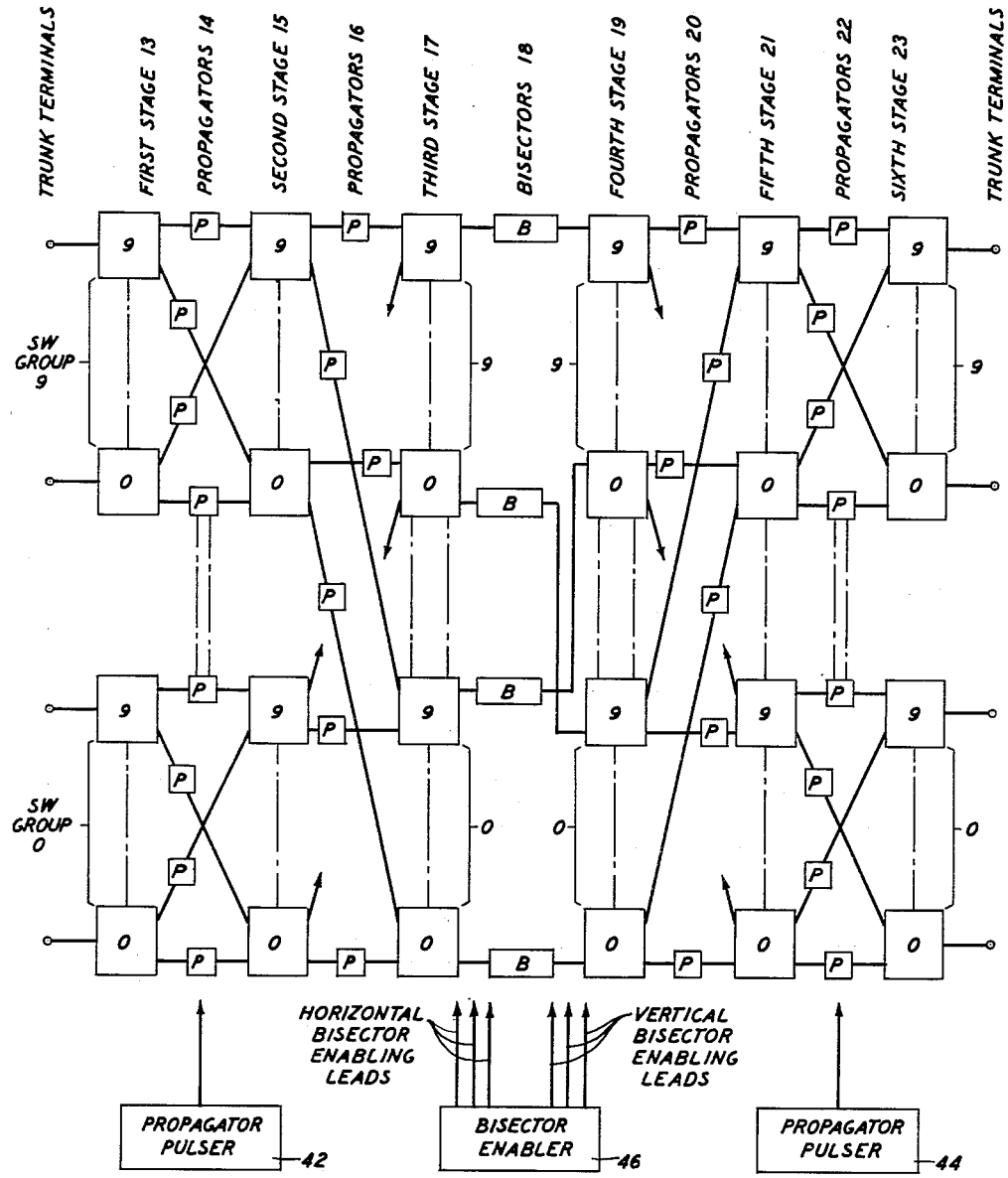
FIG. 11 is a block diagram of a specific six stage distribution network that may be employed in this embodiment of my invention.

While only a single path through the network is indicated in FIG. 1, it is to be understood that there are, of course, multiple paths through the network and a plurality of bisectors between the two portions of the network, as shown on FIG. 11 and described further below. Such multiple path network configurations wherein there are a plurality of possible paths between adjacent crosspoints in a given stage and between adjacent stages of such crosspoints are known in the art, and, as my present invention is primarily directed to control circuitries for such networks irrespective of their size or specific network configurations, for simplicity and to facilitate an understanding of my invention the specific plural paths through the network are not depicted in the figures illustrating the control circuitry but are illustrated separately in FIG. 11.

"A" identifier 35 and "B" identifier 36 are connected respectively on the A and B sides of the network. "A" trunk selector 39 and "B" trunk selector 40 are connected respectively to the first and sixth stage crosspoints to apply marking and disconnect pulses to predetermined terminal connections of these crosspoints, as will be subsequently explained. Propagator pulsers 42 and 44 are connected respectively to propagator circuits 14 and 22 selectively to enable these propagators, as will be subsequently explained.

Bisector enabler 46, match and release detector 48, and bisector release pulser 50 are connected to each of the bisector circuits 18. These circuits control the application of pulses and the delivery of pulses from the bisector circuits, as will be subsequently explained.

Logic and pulse circuits 52 are connected to the identifiers, selectors, propagator pulsers, bisector enabler, match and release detector, and bisector and release pulser. Advantageously, this logic and pulse circuitry includes AND and OR gates, delay circuits, monostable and bistable multivibrators, amplifiers, and indicating circuits. This logic and pulse circuitry controls the sequences of application of pulses to various other portions of the network control circuitry, as will be subsequently explained.

Office control 54 provides supervisory and control pulses and signals to the various circuits of the system in accordance with my invention. Accordingly, office control 54 includes various supervisory and pulsing circuits which may advantageously be connected either automatically or by an operator. Office control 54 is connected to each of the A side and the B side terminals, the "A" and "B" identifiers, the "A" and "B" selectors, and to logic and pulser circuits 52. The operator, or automatic circuitry, recognizes signals from the network terminals, and in response thereto control signals are applied from the control 54 to other portions of the network control circuitry. In its simplest form the office control 54 may be a set of manually operable keys to be actuated by a telephone operator. The operator recognizes the actuation of indicating circuitry such as line lamps and busy lamps and operates keys to initiate the desired electrical signals. For the purpose of explaining the operation of this invention, it is assumed that supervisory lamps are included in the office control 54 and that an operator actuates the network control circuit switches.

While in numerous instances throughout the drawing single lines are indicated as the connections between blocks, it is to be understood that these single lines are merely symbolic and may indicate numerous connections such as a cable.

In the simplified block diagram of FIG. 1 and the schematic diagrams described in detail below the switching network wiring pattern is not depicted. To fully appreciate the operation of my novel control circuitry it may be advantageous to describe at this point in general terms one type of switching network which I may employ together with my invention. FIG. 11 is a block diagram of a single six stage distribution network which may be employed in my invention. Between a trunk terminal and the bisector circuit are the three stages of switching and the two propagator circuits. The switches are subgrouped into groups of ten in each stage. Ten switches in the first stage are associated with ten switches in the second stage. The wiring between these switches may follow a known crossbar pattern. The ten outputs of a single first stage switch are wired, one to each of the ten switches in the second stage. The 100 wires out of a second stage switch group are wired to the ten groups of third stage switches, ten wires in a group. This conforms to the standard bisector wiring pattern in a four stage crossbar network.

The three stages on the opposite side of the network are wired in an identical manner.

The bisector wiring in the six stage network, however, is not a standard crossbar pattern. The bisector wiring here forms a full channel selection between the two halves of the network. Thus, a ninth level output of the first stage switch has access not only to the ninth level of any last stage switch through intermediate ninth level switches, but also to all other levels of the last stage switches. Switch number 9 in the third stage of switch group 0 has access to switch 0 in the fourth stage of switch group 9. Channel 9 on the A side of the network thus has access to channel 0 on the B side of the network.

Through intermediate switch groups, channel 9 on the A side gets access to all channels on the B side of the network. Similarly, through the bisector wiring pattern, all channels on the A side get access to all channels on the B side of the network. This reduces network blocking, since a busy level link on the last stage does not block the same level link on the first stage of switching.

Each of the bisector circuits is enabled sequentially, as described in detail below. To facilitate this sequential enablement the bisector circuits 18, and more specifically the parallel input resistors 464, capacitors 465, and diode 462, FIG. 10, are wired in a coordinate matrix array. Horizontal bisector enabling leads and vertical bisector enabling leads, from the bisector enabler circuit 46 are connected to the input conductors of the array. Accordingly, two enabling leads are connected to each bisector circuit, and the horizontal and vertical bisector enabling leads can be considered as being scanned, to enable the bisectors sequentially.

FIGS. 2, 3, 4, and 5, when placed side by side, in accordance with the key of FIG. 6, show in greater detail portions of a crosspoint switching network and the network control circuitry in accordance with this invention.

Figure 2:
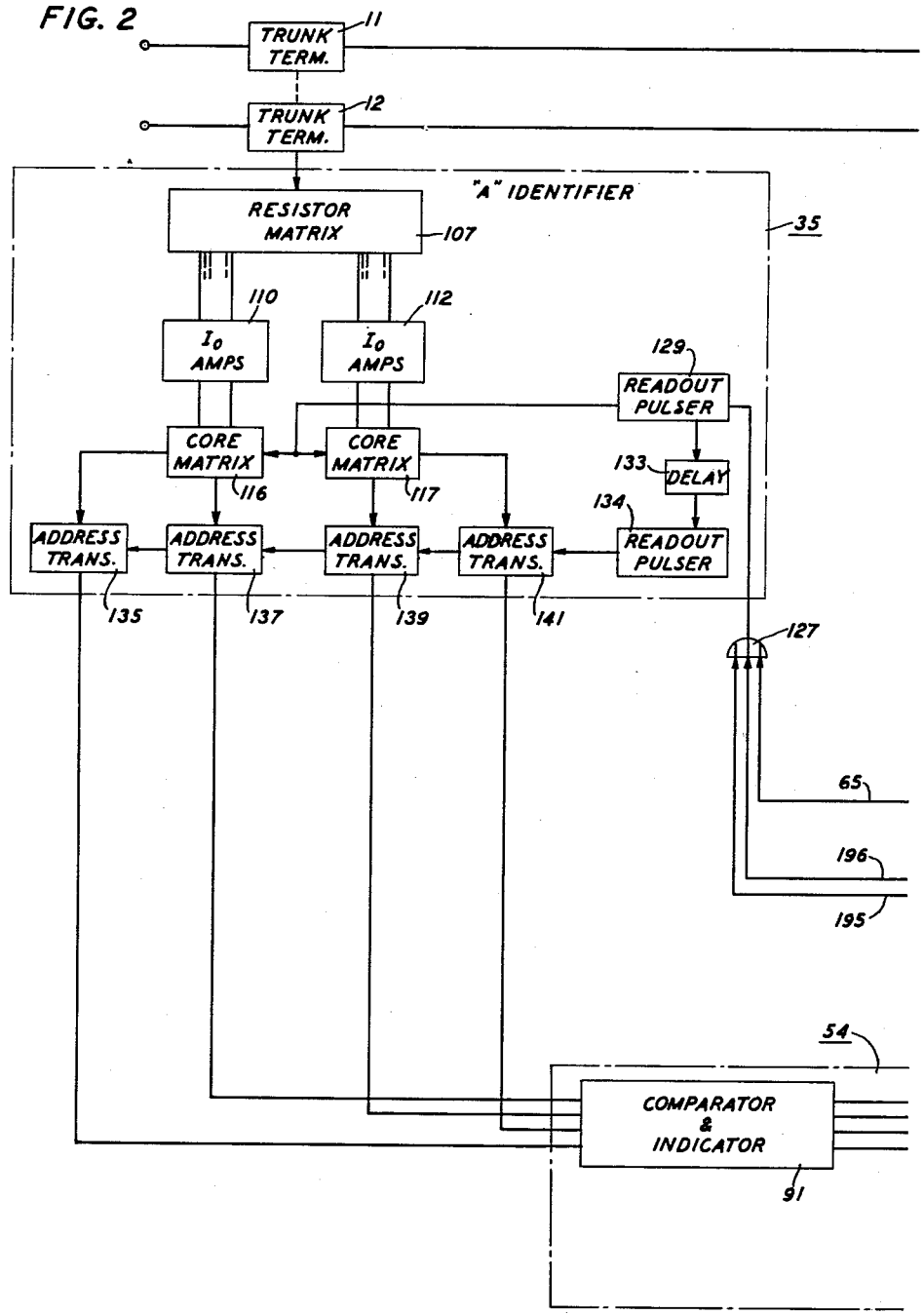

In FIG. 2 the "A" identifier 35 is shown to include a resistor matrix, magnetic core matrices, address translators, amplifiers, pulsers, and a delay circuit. Resistor matrix 107 is connected to each trunk terminal, such as terminals 11 and 12, and groups of amplifiers 110 and 112 are individually connected to the rows and columns, respectively, of resistor matrix 107. Magnetic core matrices 116 and 117 are connected to groups of amplifiers 110 and 112, respectively. Read-out pulser 129 is connected to the logic circuitry of the remainder of the network control circuit, to the core matrices 116 and 117, and to delay circuit 133. Delay circuit 133 is also connected to read-out pulser 134. Read-out pulser 134 is connected to address translators 135, 137, 139, and 141, which translators may advantageously be of the magnetic core type. These address translators are also connected to magnetic core matrices 116 and 117. The output leads of the translators are connected to comparator and indicator circuit 91, which is part of office control 54. The control lead for the "A" identifier is connected through OR logic circuit 127 to the remainder of the logic circuitry for clearing the identifier during a connect or a release operation and for reading out the identifier on either a connect or release operation, as will be subsequently explained.

"B" identifier 36, shown in FIG. 5, represents a duplication of the circuitry of "A" identifier 35.

Figure 3:
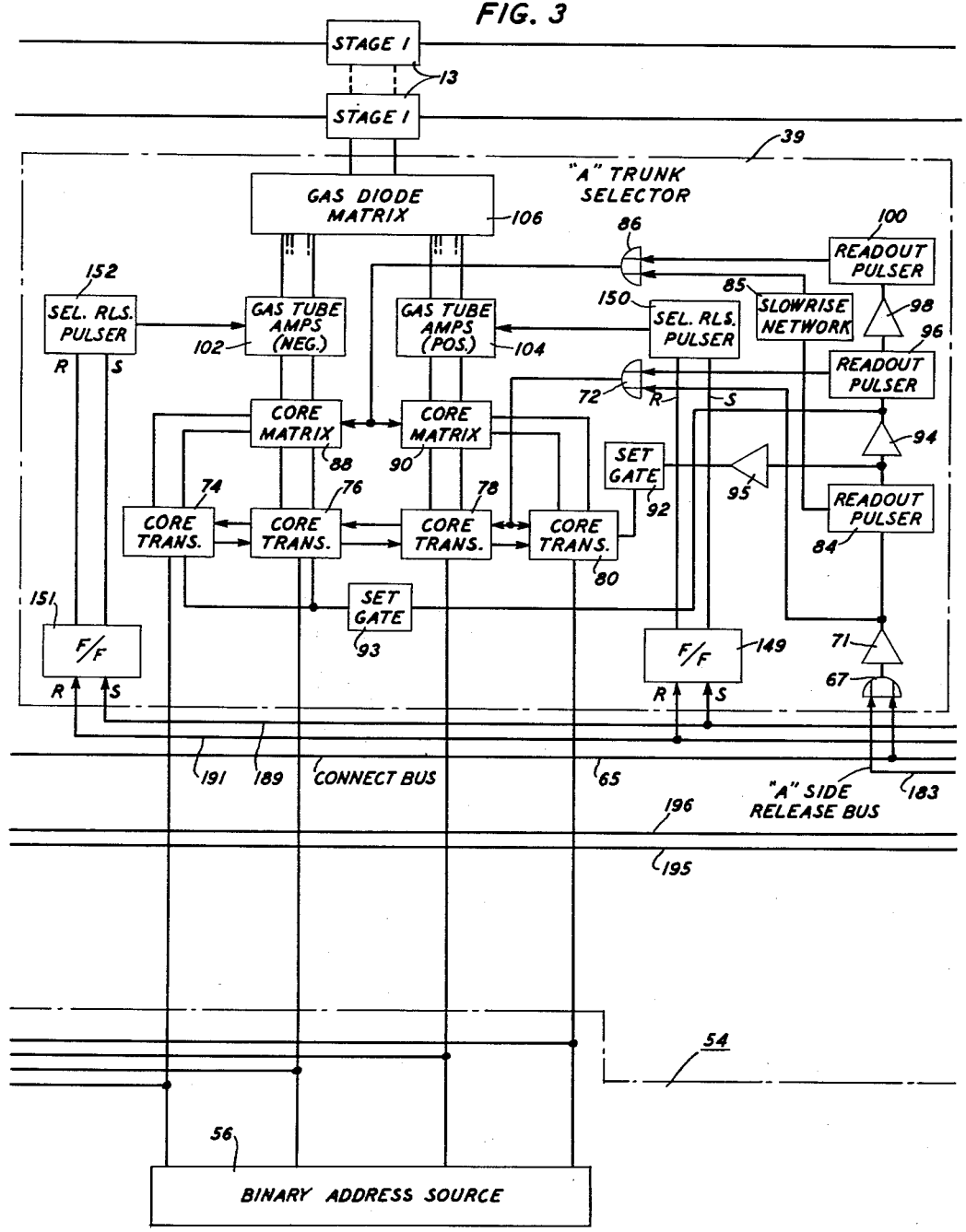

FIG. 3 includes a more detailed block diagram of "A" trunk selector 39. The "A" trunk selector includes OR logic and pulsing circuitry, "set" gates, magnetic core translators, a gas diode matrix, magnetic core matrices, amplifiers, and a slow-rise network. The input leads of OR logic circuit 67 are the control leads of the selector and are connected through connect order bus 65 and the A side release order bus 183 to other logic and pulsing circuitry of other portions of the network control circuit. The output lead of OR logic circuit 67 is connected through amplifier 71 to the input lead of read-out pulser 84 and to one of the input leads of OR logic circuit 72. One output lead from read-out pulser 84 is connected to the input leads of amplifiers 94 and 95. The output leads of amplifiers 94 and 95 are connected to set gates 93 and 92, respectively. Another output lead of read-out pulser 84 is connected to slow-rise network 85. The output lead of amplifier 94 is also connected to read-out pulser 96. One output lead of read-out pulser 96 is connected through amplifier 98 to the input lead of read-out pulser 100 and another directly to one of the input leads of OR gate 72. The output leads of read-out pulser 100 and slow-rise network 85 are connected to the input leads of OR gate 86. The output lead of OR gate 86 is connected to magnetic core matrices 88 and 90. The input leads of magnetic core translators 74, 76, 78, and 80 are connected to binary address source 56 in the office control circuit 54, and the output leads of these translators are connected to magnetic core matrices 88 and 90. The output leads of core matrices 88 and 90 are connected to the input leads of groups of negative and positive amplifiers 102 and 104, respectively. The output leads of the groups of negative and positive gas tube amplifiers 102 and 104 are connected to the rows and columns, respectively, of gas diode matrix 106. The output leads from gas diode matrix 106 are connected to the network terminal connections of the crosspoint diodes in the first stage of crosspoints. Flip-flops 149 and 151 have their set leads, designated S, connected to bus 189 and their reset leads, designated R, connected to bus 191 to receive setting and resetting signals, respectively, from other portions of the network control circuitry. The output leads of flip-flops 149 and 151 are connected to the set and reset input leads of selector release pulsers 150 and 152. The output lead of selector release pulser 150 is connected to each of the positive gas tube amplifiers in group 104. Similarly, the output lead of selector release pulser 152 is connected to each of the negative gas tube amplifiers in groups 102 in a manner shown in detail in FIG. 7B.

FIG. 4 comprises other portions of the network and control circuitry. A signal source 119 is included in the central office control 54 and may comprise a group of pulse sources to be manually operated. The various output terminals of the signal source 119 are connected to portions of the network control circuitry to supply connect, release, and reset order pulses or signals, as will be subsequently explained. Indicators 125 are also a part of office control 54 and are connected to other portions of the network control circuit to give a visual or electrical indication of the results of sequences of operations. Indicators 125 may comprise lamps at an operator switchboard so that an operator may connect the signal source 119 outputs to the network control circuits in proper sequence.

Connect order flip-flop 62 is connected through switch 60 to signal source 119. The output lead of flip-flop 62 is connected to the input lead of amplifier 63, and the output lead of amplifier 63 is connected to connect order bus 65. One output lead of connect order flip-flop 62 is also connected to OR logic circuit 66.

As herein indicated, the various flip-flop circuits are designated F/F. The two input leads of the flip-flop are designated S and R for set and reset, respectively. The two or more output leads are designated "0" and "1," indicating that when the flip-flop is in its "1" state, an output is obtained on the "1" output lead, and when the flip-flop is in its "0" state, an output is obtained on the "0" output lead. These flip-flop circuits may comprise transistor circuits of types known in the art.

The signal source 119 is also connected through switch 172 to the set input lead of A side release flip-flop 176. Amplifier 180 is connected between the "1" output terminal of flip-flop 176 and the A side release bus 183. Switch 174 is connected between the set input lead of the B side release order flip-flop 178 and signal source 119. Amplifier 182 is connected between the "1" output terminal of flip-flop 178 and the B side release bus 187. Propagator pulsers 42 and 44, FIG. 5, are connected through amplifiers 68 and 69, respectively, to connect order bus 65. Connect order time-out pulser 64 has one input terminal connected to the connect order bus 65.

Propagator pulsers 42 and 44 may each advantageously comprise a plurality of gaseous discharge devices each having a starter electrode to which the start or set pulse is applied from amplifier 68 or 69. The cathodes of the gas triodes are connected in common to groups of propagator circuits and also to appropriate bias potentials, as disclosed in Dunlap-Taylor application Serial No. 617,060, now United States Patent 2,859,282, issued November 4, 1958. A plurality of gas triodes are employed effectively in parallel in each pulser because of the large currents that must be supplied. The propagator pulser tubes are turned off by a pulse from release pulser 145 or 147 which may be a transistor linear amplifier having a transformer output coupled between the anodes of the gas triodes and the anode supply voltage to interrupt the anode supply of the gas triodes.

The various pulsers employed in the network control circuit, which are indicated as having two input leads, are pulsers which may be turned on or set when a pulse or a voltage is applied to the input lead designated as S and are turned off or reset when a pulse or a voltage is applied to the input lead designated R. Where not otherwise specifically described, these pulsers may be transistor linear amplifiers or transistor flip-flops; advantageously, time-out pulsers 64 and 186 include flip-flop circuits, integrating circuits, and threshold amplifiers, as may flip-flop 118, FIG. 5, discussed further below. A pulse applied to the time-out pulser circuit triggers the flip-flop which applies a pulse to an R-C integrating circuit to charge the condenser. When the condenser has charged to a threshold value, the output threshold amplifier fires and supplies an output pulse. When the trigger amplifier is fired, it resets the flip-flop. If before the output amplifier is fired, a reset pulse is applied to reset the flip-flop, the condenser of the R-C circuit is not charged sufficiently to trigger the amplifier and discharges through its associated resistance.

The output leads from propagator release pulsers 145 and 147 are connected to the resetting lead of propagator pulsers 42 and 44, respectively. The set input leads for the propagator release pulsers are connected to bus 189, while the resetting input leads for the release pulsers are connected to bus 191. Time delay circuit 148 is connected between bus 189 and bus 191, and delay circuit 154, FIG. 5, is connected between bus 191 and bus 195.

In order to control the actuation and release of the bisector circuits and to distinguish between output pulses derived from the bisector circuits 18, the network control circuit includes a bisector enabler 46, a bisector release pulser 50, and bisector match and release detector 48, together with logic and pulsing circuitry for controlling the application and delivery of pulses relative to the bisector circuits.

The bisector circuits 18 and the match and release detector 48 may advantageously be of the type fully described in G. E. Jacoby and J. W. Rieke application Serial No. 617,131, filed October 19, 1956, now United States Patent 2,883,470, issued April 21, 1959. To facilitate an understanding of the present invention such circuits are depicted in FIG. 10 and will be briefly described herein. The bisector circuits 18 each have input terminals 441 and 443 connected to the adjacent stages of the switching network. The talking path between these terminals includes diodes 482 and 486 and capacitor 488. Enabling pulses are applied from enabler 46 through amplifiers 136 and 138 to leads 472 and 473, which may be coordinate leads of a matrix array connected to all the bisector circuits 18 for sequential enablement of the bisector circuits. When signals are present at input terminals 441 and 443 and leads 472 and 473, match tube 470 breaks down and causes completion of the talking path, as described in the Jacoby-Rieke application. Breakdown of the tube 470 causes an increase in current through inductor 406 in detector circuit 48, and a negative pulse is applied through transformer 410 to the base of transistor 417, thereby applying a pulse to amplifier 140 advising the network control circuitry of the detection of the match. As elsewhere described, enablement of amplifier 140 causes operation of the control circuitry to turn off the bisector enablers 46 by a pulse applied to the enabler 46 over lead 43.

To release a bisector circuit to disestablish a path through the network, a release pulse from either terminal 441 or terminal 443, together with a pulse from bisector release pulser 50, causes breakdown of release tube 494, which in turn steals current from tube 470, thereby extinguishing conduction in that tube. Extinction of conduction in a tube 470 in any bisector circuit 18 causes a decrease of current through inductor 406, thereby delivering a negative pulse through transformer 410 to transistor 415, which in turn applies an enabling signal to amplifier 192. The release tube 494 is subsequently extinguished on resetting of the bisector release pulser 50.

Bisector enabler circuit 46 may comprise a pair of magnetic core stepping switches which may be of a shift register type known in the art, and a source of stepping pulses for stepping the shift register. The stepping switches, on application of a control pulse thereto from AND gate 132, step along and apply output pulses coincidentally to pairs of amplifiers or pulsers 136 and 138. These coincident pulses are thus sequentially applied to two of the control leads of the bisector ciruit, FIG. 10, and specifically to leads 472 and 473, which may actually be horizontal and vertical leads of a control matrix. On detection of a match, as discussed further below, a pulse on bus 189 is applied by lead 143 to the enabler 46 and stops the stepping action. If no match is found, then the enabler circuit stops on operation of the time-out pulser 64 which similarly causes a pulse to be applied to lead 143.

Bisector release pulser 50 may be simply a linear transistor amplifier with a transformer output, to provide sufficient output voltage. The output transformer is connected in series to all of the bisector circuits and specifically to the cathodes of release tubes 494.

An OR logic circuit 115, FIG. 5, has two input leads, one connected to bus 65, the other connected to bus 196. The output lead of OR circuit 115 is connected to the set input lead of flip-flop 118. The "1" output lead from flip-flop 118 is connected to AND logic circuit 120, while a steady state "0" output lead from flip-flop 118 is connected to AND logic circuit 124. A transient "0" output lead from flip-flop 118 is connected back to the resetting lead of flip-flop 118, as well as to one input lead of AND circuit 132. Flip-flop circuit 118 may be a transistor circuit similar to the other flip-flop circuits employed in my circuit and known in the art, except that a differentiating circuit is connected to one of the outputs so that there is a distinct output lead for a transient condition and for a steady state condition. Alternatively, circuit 118 may be a bistable circuit with an integrating R-C circuit and a threshold amplifier, similar to the time-out pulsers described above. In such a circuit the transient output is taken from the output of the threshold amplifier, which output is also applied to reset the bistable circuit. The steady state "0" and "1" outputs are taken from the bistable circuit directly. AND circuit 132 has two additional input leads, one connected to lead 157, the other connected to the output lead of amplifier 128. The output lead from AND circuit 132 is connected to the start or set lead of bisector enabler 46. The resetting lead for bisector enabler 46 is connected to bus 189. The output of bisector enabler 46 is connected through pairs of amplifiers, such as 136 and 138, to each of the bisector circuits. When turned on or set, bisector enabler 46 sequentially applies pairs of enabling pulses to each of the bisector circuits, as will be subsequently explained.

The input lead of match and release detector 48, described above and depicted in FIG. 10, is connected to all the bisector circuits. The match and release detector has two output leads, one connected to deliver a match indicating signal to amplifier 140, the other connected to deliver a release indicating signal to amplifier 192. The A and B side release order flip-flops 176 and 178, respectively, are connected through OR logic circuit 179 to the enabling input lead of amplifier 192. Similarly, connect order flip-flop 62 and busy check flip-flop 118 are connected through OR logic circuit 66 to the enabling input lead of amplifier 140. Signals on these enabling input leads control the selective transmission of pulses from match and release detector 48 through amplifiers 140 and 192, as will be subsequently explained. The output lead from amplifier 140 is connected to input leads of AND logic circuit 120, AND logic circuit 124, and AND logic circuit 129. The output lead from AND logic circuit 120 is connected to the set input lead of busy indicating flip-flop 122. The output lead from amplifier 192 and the output lead from AND logic circuit 124 are connected to the input leads of OR logic circuit 142. The output lead of OR circuit 142 is connected to the set input lead of operation-successful indicating flip-flop 130. The output lead from AND circuit 129 and the output lead from amplifier 192 are connected to two of the input leads of OR logic circuit 144, the output lead of which is connected to bus 189. The output lead of connect order time-out pulser 64 is connected through amplifier 146 to one input lead of OR circuit 144. The set input lead of time-out pulser 64 is connected to bus 65, and the reset input lead of time-out pulser 64 is connected to bus 189. The set and reset input leads of release order time-out pulser 186 are connected to bus 196 and to bus 189, respectively.

The A side release order bus 183 and the B side release order bus 187 are connected to the input leads of OR logic circuit 184. The output lead of OR circuit 184 is connected to bus 196. AND circuit 194 has two input leads, one connected to bus 196, the other connected to bus 195. The output lead of AND circuit 194 is connected through delay circuit 197 and circuit 160 to the set input lead of operation-ended indicating flip-flop 162. AND circuit 156 has two input leads, one connected to bus 195, the other connected to the "1" output lead of flip-flop 62. The output lead from AND circuit 156 is connected through delay circuit 158 to the other input leads of OR circuit 160. The "1" output lead of flip-flop 162 is connected through amplifier 164 to the resetting input leads of flip-flops 62, 176, and 178 to reset these flip-flops at the end of a sequence of operation, as will be subsequently explained. The output lead of amplifier 164 is also connected to indicators 125.

Signal source 119 is also connected through manually operated switch 175 to the resetting input leads of flip-flops 122, 130, and 162. The output leads of flip-flops 122 and 130 are conected through amplifiers 123 and 131, respectively, to indicators 125. Indicators 125 may be any convenient electrical circuits and for the purpose of manual operation of office control 54 may include indicating lamps.

Advantageously, the network control circuit is symmetrical with respect to the bisector control circuits, that is, the propagator control circuits on the B side, the "B" trunk selector 40, and the "B" identifier 36 are identical in configuration and operation with those on the A side. Similarly, binary address source 58 and comparator and indicator circuit 37 are similar to their A side counterparts 56 and 91, respectively.

Connect operation

In order to initiate a connect operation in the crosspoint switching network in response to an incoming call, three signals must be fed into the network control circuit, namely the "A" and "B" terminal addresses which are applied in binary form and the connect order signal. If the system is controlled by an operator, the operator first applies the binary addresses from sources 56 and 58 and closes connect order switch 60 which actuates connect flip-flop 62. A pulse from connect flip-flop 62 sets the connect time-out pulser 64 through amplifier 63. The pulse from connect flip-flop 62 also turns on propagator pulsers 42 and 44 through amplifiers 68 and 69, respectively, which propagator pulses simultaneously pulse all the propagators 14 and 22, respectively. A pulse from connect flip-flop 62 also passes along bus 65 through OR gate 67 and turns on amplifier 71 in "A" trunk selector 39. The pulse on bus 65 passes through an OR gate (not shown), which is similarly included in "B" trunk selector 40.

The pulse delivered from amplifier 71 starts the "A" selector operation. A pulse delivered by amplifier 71 through OR gate 72 clears out any information previously stored in core translators 74, 76, 78, and 80 in a manner which will be explained in detail in the section entitled, "Detailed Terminal Selecting Operation." A pulse from amplifier 71 also causes a pulse to be delivered from read-out pulser 84. Read-out pulser 84 sends a "clear" pulse through slow-rise network 85 and OR gate 86 to clear the cores in matrices 88 and 90. Slow-rise network 85 is a circuit which absorbs the sharply rising leading edge of the pulse from read-out pulser 84. In its simplest form circuit 85 may be a resistor-capacitance integrating circuit. By applying a slowly rising clear or resetting pulse to magnetic core matrices 88 and 90, any cores which were erroneously set may be reset without causing an erroneous output signal to be delivered to the associated gas tube amplifier. Read-out pulser 84 also sends a pulse through amplifier 95 to set gate 92 and sends a pulse through amplifier 94 to read-out pulser 96 and to set gate 93. Set gates 92 and 93 close the binary address input circuits, permitting the binary address to be read into core translators 74, 76, 78, and 80 in a manner which will be explained in detail in the section entitled, "Detailed Terminal Selecting Operation."

Read-out pulser 96 applies a read-out pulse to core translators 74, 76, 78, and 80, which translators select a core in each of matrices 88 and 90 in accordance with the input binary address. Read-out pulser 96 also delivers a pulse through amplifier 98 to read-out pulser 100. Read-out pulser 100 delivers a read-out pulse through OR gate 86 to read out or reset the selected core in each of matrices 88 and 90. When the selected core in matrix 88 is reset, an associated negative gas tube amplifier in group 102 is ionized. Similarly, the resetting of the selected core in matrix 90 causes an associated positive gas tube amplifier in group 104 to be ionized. The ionization of this selected positive and this selected negative gas tube amplifier delivers coincident pulses which ionize a single gas diode in matrix 106. The ionization of this selected diode in matrix 106 applies a marking voltage to a terminal connection of the associated crosspoints in first stage 13 of the crosspoint network. A similar marking process takes place in "B" trunk selector 40 applying a marking voltage to a terminal connection of selected crosspoints in sixth stage 23, the particular terminal connection marked being determined by the binary address from source 58.

The marking pulses are also delivered through the terminals 11, 12 and 25, 26 to "A" and "B" identifier resistor matrices such as matrix 107 of the "A" identifier, in turn causing an output signal to be delivered through one amplifier in each of groups 110 and 112. Each output signal sets a core in each of the core matrices of the identifiers such as matrices 116 and 117 in the 'A' identifier.

Connect order flip-flop 62 also delivers a pulse over lead 65 to the "A" identifier 25 through OR logic circuit 127, FIG. 2, and to "B" identifier 36 through OR logic circuit 168. OR logic circuit 127 applies a pulse to read-out pulser 129, which then delivers read-out pulses to core matrices 116 and 117. Read-out pulser 129 also delivers a pulse through delay circuit 133 to read-out pulser 134. The read-out pulse supplied to matrices 116 and 117 causes the core selected by the signals from the amplifiers to be reversed, thereby delivering output signals to address translators 135, 137, 139, and 141. Subsequently read-out pulser 134 applies a read-out pulse to address translators 135, 137, 139, and 141, causing a binary address, indicative of the selected network terminal, to be delivered to comparator and indicator circuit 91. Comparator circuit 91 compares the binary address from source 56 with the binary address received from the selected terminal and gives an indication to the operator, as by lighting of a lamp, of a successful comparison, thus providing a check of the proper operation of the selector circuit. "B" trunk selector 40 and "B" identifier 36 cooperate to deliver binary addresses to comparator and indicator 37 in a manner similar to the operation of "A" selector 39, "A" identifier 35, and comparator 91. The operation of the identifier circuit will be explained in greater detail in the section entitled, "Detailed Terminal Identifying Operation."

The connect order pulse from flip-flop 62 is also applied through amplifier 63, lead 65, and OR circuit 115 to flip-flop 118, FIG. 5. Advantageously, flip-flop 118, which may be a monostable multivibrator or a bistable multivibrator and integrating circuit, as described above, returns to its "0" or stable state 250 microseconds after being set. This delay allows sufficient time for the control circuit to perform a busy test or check of the crosspoint network terminals. During the time that flip-flop 118 is set it applies an enabling pulse through its "1" output terminal to AND gate 120. If a marking pulse is applied to a busy network terminal in a busy or established path, the pulse is transmitted to the bisector circuit of the established path. This pulse causes an increase in bisector current, which, in turn, causes the match and release detector 48, which is serially connected in the bisector current supply circuit, to deliver an output pulse to the input terminal of amplifier 140. Since amplifier 140 is enabled by a voltage from flip-flop 62 applied to the enabling input terminal, through OR circuit 66, the pulse from match and release detector 48 will be delivered through amplifier 140. This pulse will pass through AND gate 120 because this gate is enabled by the above-mentioned "1" output pulse from flip-flop 118. A pulse through AND gate 120 is applied to the set input lead of busy circuit indicating flip-flop 122. In response to this pulse, flip-flop 122 delivers a "1" output pulse through amplifier 123 to indicators 125. The output pulse from amplifier 140 will also be fed through AND gate 129, which gate is enabled by an output voltage from flip-flop 62, and through OR gate 144 to conductor 189 to clear the connect control circuitry, as will be explained in greater detail in the section entitled, "Network Control Clear Circuitry."

After 250 microseconds, flip-flop 118 returns to its "0" or stable state and delivers a "0" output signal to AND gate 124, which AND gate, when abled, will permit a pulse from amplifier 140 to be delivered to operation-successful flip-flop 130, as will be subsequently explained.

Flip-flop 118 also delivers a transient "0" output pulse to AND gate 132. The term transient "0" signal, as herein employed, means a signal which is delivered only during a change in state of the flip-flop from its "1" state to "0" state. Such a transient output signal may be obtained from a differentiating circuit connected as part of the output circuit of flip-flop 118. AND gate 132 will be actuated if inputs are present on its input leads from busy flip-flop 122 (indicating that neither terminal is busy), flip-flop 118, and connect flip-flop 62. If these conditions are met, which situation will exist if neither terminal is busy and a connect order pulse has been applied to the control circuitry, a start or set pulse is applied to bisector enabler 46.

Bisector enabler 46 now sequentially applies coincident pulses through pairs of amplifiers, such as amplifier 136 and amplifier 138, to each of the bisector circuits. These coincident pulses will be coincident at each of the bisectors in accordance with a predetermined sequence. Only that bisector at which the coincident pulses are present can be enabled. This bisector will be enabled if four conditions are met, namely, the application of the above-mentioned two pulses from the bisector enabler, and a coincidence of a marking pulse from the crosspoint of the third stage connected to that bisector and a marking pulse from the crosspoint of the fourth stage connected to that bisector.

When a bisector is actuated, establishing a path through the network, a pulse in the current through match and release detector 48 takes place, causing detector 48, as described above and shown in FIG. 10, to deliver an output pulse through amplifier 140 to AND gate 124. As explained above, amplifier 140 is enabled by the pulse from connect order flip-flop 62 applied through OR gate 66, and AND gate 124 is enabled by the "0" output pulse from flip-flop 118. The pulse from amplifier 140 therefore passes through AND gate 124 and OR gate 142 to the operation-successful flip-flop 130. In response to this pulse, operation-successful flip-flop 130 delivers a pulse through amplifier 131 to indicators 125, thereby giving an indication of a successful sequence of operation, which in this instance is a connect operation. Amplifier 140 also delivers a resetting pulse through AND gate 129, which is enabled by the output signal from flip-flop 62, and OR gate 144 to bus 189 to reset connect order time-out pulser 64.

A pulse on bus 189 may be called the Off "0" pulse, for this marks the point in time at which the control circuitry begins to turn itself off. This Off "0" pulse sets propagator release pulses 145 and 147, resets bisector enabler 46, and sets the selector release pulsers, such as pulsers 150 and 152 in the "A" selector, by setting flip-flops 149 and 151, respectively. Selector release pulsers 150 and 152 turn off the selected positive and negative gas tube amplifiers. When the selected positive and negative gas tube amplifiers are turned off, they cause the selected gas diode of gas diode matrix 106 to be deionized, thereby removing the marking potential from the selected crosspoints of the first stage. The "B" trunk selector is released in a similar manner in response to the Off "0" pulse. These crosspoints in this established path are now sustained by a separate source of sustain potential (not shown) which may be permanently connected to the network terminals, as is known in the art; one specific arrangement is disclosed in my application Serial No. 617,087, filed October 19, 1956, now United States Patent 2,859,283, issued Nov. 4, 1958.

The Off "0" pulse is also fed through delay circuit 148, FIG. 4, to bus 191. Advantageously, delay circuit 148 has a delay of 250 microseconds, and the pulse on bus 191 may therefore be called the OFF 250 pulse. The Off 250 pulse resets "A" selector flip-flops 149 and 151, which, in turn, reset release pulsers 150 and 152, respectively. Similarly, flip-flops and selector release pulsers (not shown) in the "B" selector are reset by the Off 250 pulse.

The Off 250 pulse also passes from bus 191 through delay circuit 154, FIG. 5, to bus 195. Advantageously, this delay may be of the order of 50 microseconds. The pulse on bus 195 may therefore be called the Off 300 pulse (the sum of the 250 microsecond delay of circuit 148 and 50 microsecond delay of circuit 154).

The Off 300 pulse passes through OR gates 127 and 168 and causes read-out of the "A" and "B" identifiers in a manner which will be explained in detail in the section entitled, "Detailed Terminal Identifying Operation." The Off 300 pulse is also applied to one input terminal of each of AND gates 156 and 194, FIG. 4. Since connect flip-flop 62 applies an enabling pulse to AND circuit 156, the Off 300 pulse passes through AND logic circuit 156, delay circuit 158, and OR logic circuit 160 to set input lead of operation-ended flip-flop 162. In response to this pulse, operation-ended flip-flop 162 delivers a pulse through amplifier 164 to indicators 125. The output pulse from amplifier 164 is also delivered to the resetting input leads of flip-flops 62, 176, and 178.

The indication of a successful comparison of a binary address in comparator and indicators 37 and 91, together with the operation-ended and operation-successful indicators in block 125, shows that a path has been established through the network, that in fact it was the correct path through the network, and that the control circuitry is operating correctly. Switch 175, FIG. 4, may now be momentarily closed by the operator, applying a signal to the reset input leads of flip-flops 122, 130, and 162. The control circuitry is now in its quiescent condition ready to establish another path or to release an established path.

Release operation

In order to release an established transmission circuit or path, the binary address indicative of one of the terminals is first applied by the operator through the "A" or "B" selector from the associated one of binary address sources 56 and 58. The operator then closes release order switch 172 or 174, depending on whether the "A" or "B" binary address is to be applied, thus actuating release order flip-flop 176 or 178, respectively. Assuming the release is to be effected from the A side, the A side binary address is applied and A side release switch 172 is closed, setting A side release flip-flop 176. A pulse from release flip-flop 176 is fed through amplifier 180 to A side release bus 183. This pulse on bus 183 may be called the A side release pulse. The A side release pulse actuates the "A" trunk selector through OR gate 67, and a single gas diode in matrix 106 is actuated in accordance with binary address from source 56. The selector release operation is accordingly identical to the selector connect operation, and a pulse is applied to the predetermined busy network terminal. Advantageously, the connect and release pulses may be of the same polarity and magnitude.

The A side release pulse is also fed through OR gate 184 to bus 196. This pulse on bus 196 sets release order time-out pulser 186, bisector release pulser 50, and flip-flop 118. In response to this pulse, bisector release pulser 50 simultaneously applies a release pulse to all the release tubes 494, FIG. 10, in all the bisectors. The pulse on bus 196 initiates the operation of the "A" and "B" identifiers through OR gates 127 and 168, respectively. For example, the pulse through OR gate 127 turns on read-out pulser 129. The operation of the identifiers will be explained in greater detail in the section entitled, "Detailed Terminal Identifying Operation."

As mentioned above, the terminal disconnect pulse is of the same polarity as the marking pulse, and this pulse progresses through the established path to the bisector circuit. The bisector circuit, which receives a pulse through the established path and a pulse from bisector release pulser 50, will be deactuated. When a bisector is deactuated, a pulse is transmitted to match and release detector 48 which generates a release indicating pulse, as described above and shown in FIG.10. The circuitry and operation of the bisector circuits and the match and release detector are further disclosed and described in detail in application Serial No. 617,131, filed October 19, 1956, by G. E. Jacoby and J. W. Rieke, now United States Patent 2,883,470, issued April 21, 1959.

The release indicating pulse is delivered to amplifier 192, which amplifier is enabled by a signal from A side release flip-flop 176 applied through OR gate 179. Therefore, the release indicating pulse passes through amplifier 192 and OR gate 142 to the set input lead of operation-successful flip-flop 130. In response to this pulse, flip-flop 130 sends a signal through amplifier 131 to indicators 125. This release indicating pulse from amplifier 192 also passes through OR gate 144 to Off "0" bus 189.

The pulse on bus 189 resets release order time-out pulser 186, which, in turn, delivers a turn-off pulse through amplifier 188 and OR gate 144 to bus 189. The turn-off pulse on bus 189 turns off propagator release pulsers 145 and 147 and turns on flip-flops in the trunk selector, such as flip-flops 149 and 151 in the "A" selector, in a manner identical to that followed on the completion of a connect operation. This turn-off pulse is fed through delay circuits 148 and 154 to bus 195. The pulse on bus 195 will be applied to one input terminal of AND gate 194, which gate is enabled by the previously mentioned pulse from A side release order flip-flop 176 fed through OR gate 179. The pulse from AND gate 194 passes through delay circuit 197 and OR gate 160 to the set input lead of flip-flop 162. The resulting "1" output signal from flip-flop 162 is amplified by amplifier 164 and applied to the resetting input terminals of flip-flops 62, 176, and 178. This signal is also applied to indicators 125, thus indicating to the operator that the release sequence of operation is ended.

The previously mentioned turn-off pulse on bus 195 also actuates the "A" and "B" identifiers, causing these identifiers to deliver output binary addresses indicative of the terminals to which pulses were applied during the release process in a manner similar to that followed during the connect sequence with one significant distinction. When a path is to be disconnected, a release pulse is applied to only one terminal of an established path (in the above example the "A" terminal). The interruption of the current in this path causes a signal in the "B" terminal to which the path was established. This signal appears in the resistor matrix (not shown) of the "B" identifier. When the "B" identifier is actuated by the Off 300 pulse fed through OR gate 168, the resulting binary address delivered to comparator and indicator 37 will be indicative of the "B" terminal which was employed in the path just released.

An indication of a comparison of binary addresses in each of comparators 91 and 37, together with an operation-ended and an operation-successful indication in indicators 125, signifies that the path has been disconnected, that it was the correct path, and further that the network control circuitry is operating correctly. Switch 175 may now be momentarily closed by the operator, completing the path for resetting signals to be delivered from source 119 to flip-flops 122, 130, and 162. The network control circuitry is now in its quiescent condition, ready to release an established path or to establish a new path through the network control.

Network control clear circuitry

Advantageously, the network control circuit includes clear circuitry for restoring the control circuit to its quiescent condition after each unsuccessful connect or disconnect order. Also advantageously, the operation of the clear circuitry takes place after a predetermined time interval. The particular interval of time is determined by whether a connect tor a disconnect sequence is unsuccessful. For example, in this illustrative embodiment, the time interval allowed for a connect operation before the clear circuitry operates is of the order of 50 milliseconds, while the release operation time interval is of the order of 2 milliseconds. The connect sequence time interval is determined by the connect order time-out pulser 64, FIG. 4, which, as described above, may include a bistable circuit, integrating circuit, and threshold amplifier. The time-out pulser returns to its initial state approximately 50 milliseconds after being set by the connect order pulse, unless priorly reset. Similarly, the release sequence time interval is determined by release order time-out pulser 186, which may also comprise a bistable flip-flop and an integrating circuit. This flip-flop is returned to its initial state by operation of the integrating circuit and threshold amplifier approximately 2 milliseconds after being set by a release order pulse on bus 196.

The difference in time-out intervals for establishing and releasing a path is to allow time, on establishment of the path for the sequential enablement of all of the bisector circuits.

When the time-out pulser operates, it transmits a turn-off pulse through its associated amplifier 148 or amplifier 188, depending on which of the time-out pulsers is involved. The turn-off pulse from either of these amplifiers passes through OR gate 144 to Off "0" bus 189.

If the turn-off pulse is generated by connect order time-out pulse 64, the turn-off operation of the control circuitry will be the same as that followed in the above-mentioned connect sequence. If, however, the turn-off pulse is generated by release order time-out pulser 186, the turn-off operation of the control circuitry will be the same as that followed in the above-mentioned release sequence. In the turn-off operation of either the connect or release sequences a similar operation is followed with one principal distinction. This distinction is in the path followed by the Off 300 microsecond pulse on bus 195 in reaching the set input lead of flip-flop 162. In the instance of a connect order, AND gate 156 is enabled and the Off 300 microsecond pulse on bus 195 passes through AND gate 156, delay circuit 158, and OR gate 160 to the input terminal of operation-ended flip-flop 162. However, in the instance of a release order, AND gate 194 will be enabled by the pulse on the output of OR gate 179, and the Off 300 microsecond bus will pass through AND gate 194, delay circuit 197, and OR gate 160 to the set input lead of flip-flop 162.

The purpose of these different paths for the Off 300 microsecond pulse is to provide a longer delay in the instance of a release order than in the instance of a connect order. This difference in delay is provided to permit a portion of the bisector circuit, and more specifically the bisector release tube 494, FIG. 10, to be released. On a connect order the bisector circuit is the last portion of the network to be actuated. Therefore, if the connect operation is unsuccessful, there is no requirement for releasing the bisector circuit. Accordingly, the connect order delay circuit 158 need only have a delay of the order of 10 microseconds, while the release order delay circuit 197 has a delay of the order of 1.5 milliseconds.

Detailed terminal selecting operation

Figure 7A:
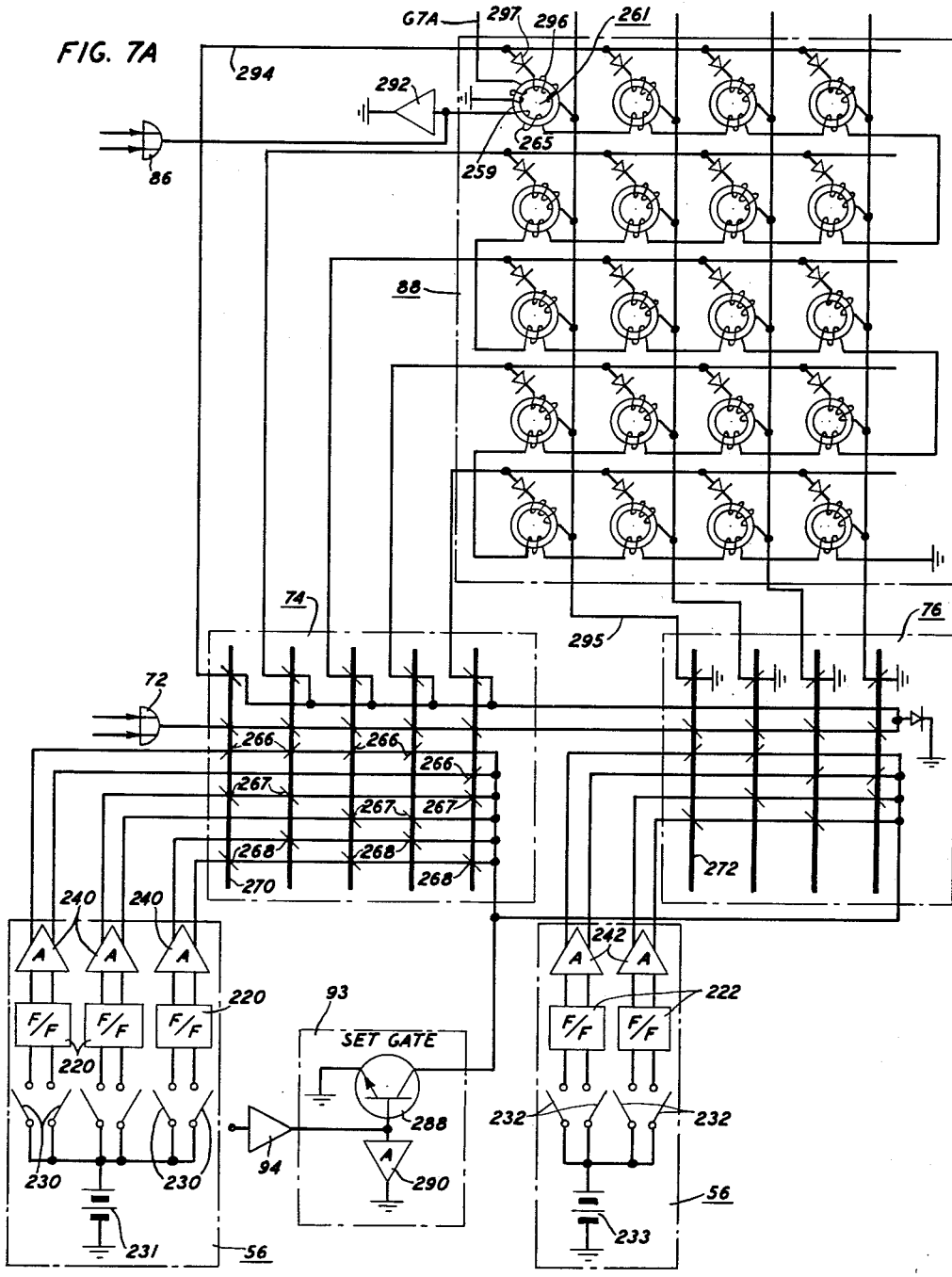

Whenever a path is to be established through the network or an established path is to be disconnected, a mark or a disconnect pulse is applied to the predetermined terminal of the network. In either instance, the pulse actually applied to the network terminal is of the same magnitude and polarity and this pulse is applied through the appropriate trunk selector circuit. Since the "A" and "B" trunk selector circuits are of identical configuration, it is necessary only to describe the operation of one of these selector circuits. Further, since the trunk selector circuit includes two pairs of core translator circuits, each driving a core matrix, the operation of these translators and matrices is identical. For the sake of simplicity, only two of the core translators and one the core matrices is shown in detail in FIG. 7A. One positive and one negative amplifier from groups 104 and 102, respectively, are shown in detail in FIG. 7B, and the outputs of these two amplifiers are connected to a column and a row, respectively, of gas diode matrix 106. Only that diode of the gas diode matrix which is connected between the row and the column connection associated with the two gas tube amplifiers is shown in FIG. 7B. In order to initiate the terminal selecting operation for the purpose of applying either a mark or a disconnect pulse to a network terminal, the binary address of the terminal and a selector start pulse are required. The selector start pulse may be the result of a connect order pulse or of a release order pulse, as the case may be.

The binary address may be supplied from any convenient source and, for the purpose of explanation of this circuit, is assumed to be supplied by a plurality of flip-flops located in the office control or switchboard 54 and controlled by manually operated pairs of switches 230 and 232. Flip-flop circuits 220 and 222 are connected to individual amplifiers 240 and to pairs of leads of core translators 74 and 76. The other sides of these switches are connected to a suitable source of potential, such as sources 231 and 233. Magnetic core translator 74 includes five square loop ferromagnetic cores, and translator 76 includes four similar cores, which cores are indicated by the use of mirror symbols. These cores, as well as the other cores in the control circuitry, exhibit rectangular hysteresis loops and may assume either of two stable states of remanent magnetization, as is well known in the art.

Mirror symbols are disclosed and explained in detail in an article by M. Karnaugh entitled, "Pulse-Switching Circuits Using Magnetic Cores," on page 572 of the Proceedings of the I.R.E., volume 43, No. 5, May 1955. As therein indicated, magnetic cores are represented by heavy vertical line segments, winding leads by horizontal line segments, and windings by 45 degree mirror symbols at the intersections of the vertical cores and the horizontal leads. The sense or direction of the magnetic field associated with a current in a given winding is obtained by "reflecting" the current on the winding mirror symbol. The directions of the electromotive forces induced, when the applied field switches the core, are found by reversing this field and reflecting it in each winding mirror symbol.

Set gate 93 includes transistor 288 and amplifier 290. Transistor 288 is serially connected between the return path of all the input address windings of translators 74 and 76. Transistor 288 is normally nonconducting. However, when voltages are applied from the amplifiers 240 and 242 through the translator windings and the collector of transistor 288 and a pulse is applied to the base of transistor 288 from amplifier 94, this pulse is amplified by amplifier 290, causing transistor 288 to conduct, thus completing the return path for the input binary addresses.

Advantageously, these binary addresses need not be applied simultaneously, since they are applied to the translator windings as direct current voltages and the return path to these amplifiers includes the set gate which is not actuated until after a considerable delay. This delay is introduced by read-out pulser 84 in the "A" selector and a similar pulser (not shown) in the "B" selector. The output pulse from read-out pulser 84 is delivered a short time after the application of a turn-on pulse applied to read-out pulser 84 from amplifier 71. In response to the output pulse from read-out pulser 84, set gate 92, shown only in FIG. 3, and set gate 93, shown in FIGS. 3 and 7A, are actuated, thus completing the input circuits for the application of the binary address to translators 74 and 76, shown in FIGS. 3 and 7A, and translators 78 and 80, shown only in FIG. 3. Each of the translator core output windings is connected to a row or a column of core matrix 88. Core matrix 88 is a coincident voltage matrix in that a single winding, such as winding 296, is connected in series with a diode, such as diode 297, between a row and a column lead. Each of the cores of the matrix has an individual output winding, such as winding 259 on core 261, which winding is also shown in FIG. 7B connected to the starter anode of gas triode 264 through capacitor 262 and resistor 265; while only one output winding 259 is shown, it is to be understood that each core of the matrices similarly has a distinct output winding.

Binary address source 56, shown in FIG. 3, is connected in a similar manner to core translators 78 and 80. Translators 78 and 80 are connected to magnetic core matrix 90 in the same manner as that employed between translators 74 and 76 and matrix 88. A single core 270 of matrix 90 is shown in FIG. 7B. Translators 78 and 80 and matrix 90 are not shown schematically, since they are identical to those already shown in FIGS. 7A and 7B.

Gas triode 264 is one of the negative gas tube amplifiers of circuit 102 in FIG. 3, while gas triode 274 is one of the positive gas tube amplifiers of circuit 104 in FIG. 3. Suitable potentials are connected to apply suitable sustaining and bias potentials to the gas triode amplifiers in a manner well known in the art. The anode of tube 264 is connected to a row lead of gas diode matrix 106, while the cathode of amplifier 274 is connected to a column lead of gas diode matrix 106. Gas diode 276 and its associated resistor 278 are representative parts of matrix 106 and are common to only the row lead and the column lead associated with triodes 264 and 274, respectively. Diode 280, which may be a semiconductor diode, is connected between the point intermediate gas diode 276 and resistor 278 and a network terminal connection of the first stage crosspoints, for example, the terminal connection 12; it is understood, of course, that several of the crosspoint diodes of the first stage may be connected to this same terminal.

Selector release pulser 150 is serially connected between source 271 and resistor 284, which is connected to the anode of gas triode 274. Release pulser 150 is similarly connected to each of the other positive gas tube amplifiers in group 104. Selector release pulser 152 is serially connected between source 277 and resistor 286, which is connected to the cathode of triode 264. Selector release pulser 152 is similarly connected to each of the negative gas tube amplifiers in group 102.

The sequence of the terminal pulsing operation of the selector, the associated binary address source, and the control circuitry is as follows. The binary address is applied to the translator in response to the closing of appropriate ones of pairs of switches 230 and 232, indicative of the core to be selected in matrix 88. If it is desired to deliver a digit or "1" to the translator, the left-hand switch of the pair is closed. If, however, a zero signal is desired, the right-hand switch of the pair is closed. In response to the closing of these switches by the operator, flip-flops 220 and 222 apply direct current voltages through amplifiers 240 and 242 to the cores of translators 74 and 76.

The operation of all the translator circuits in the network control circuitry in translating from input binary addresses to electrical signals for selecting an individual core in the associated matrix is similar to that disclosed on page 190 of the Radio Corporation of America Review, volume 13, No. 2, June 1952.

Assume that all the cores in translators 74 and 76 are magnetized in the downward direction following a read-out pulse from gate 72, and further assume that the address applied is that of core 261 in the upper left-hand corner of matrix 88. On the basis of these assumptions a "1" pulse is applied from the left-hand flip-flop 220, a "0" pulse from the middle flip-flop 220, and a "1" pulse from the right-hand flip-flop 220. These pulses are applied to various of the input windings 266, 267, and 268 of the translator 74 so that every core but one is left with its magnetization in a downward condition. Specifically, for the applied input pulses core 270 will have its magnetization reset, so that it is magnetized in an upward direction by the pulse from the left-hand flip-flop. Other cores reset by the pulse applied to windings 266 thereon will be reset by the pulses applied to their windings 267 or 268. It can be seen that for each core there is a unique input code which will leave that core set so that an output pulse can occur on application of the read-out pulse from gate 72.

At approximately the same time that the binary address from source 56 is applied to translators 74, 76, 78, and 80, connect order switch 60, shown in FIG. 4, is closed, causing connect order flip-flop 62 to be actuated. The actuation of flip-flop 62 causes pulse 301, shown in FIG. 8, to be applied through amplifier 63, bus 65, and OR gate 67 to the input of amplifier 71. In response to pulse 301, amplifier 71 applies pulse 302, shown in FIG. 8, through OR gate 72 to translators 74, 76, 78, and 80. Pulse 302 is a clearing pulse to clear any residual information falsely stored in the translators, thus assuring that only the correct binary address will be present at the translators for a selecting operation.

After pulse 302 is applied to the translator cores to clear any information erroneously stored in the cores, read-out pulser 84 applies pulse 303, shown in FIG 8, through slow-rise network 85 and OR logic circuit 86 to clear any information erroneously stored in the cores of matrices 88 and 90 in response to the previously mentioned clear pulse applied to the core translators. Slow-rise network 85 may advantageously be a resistor-capacitor intergrating circuit having a relatively short time constant which causes the leading edge of puse 303 to exhibit a slowly rising leading edge. The purpose of the application of a pulse having a slowly rising leading edge to the core matrices is to clear any information which was erroneously stored in the cores. If any information was erroneously stored in the cores, these cores will be slowly switched by the slowly rising pulse, and no output pulses will be derived from the core matrices to erroneously trigger one or more of the gas tube amplifiers.

After pulse 303 is applied to matrices 88 and 90, pulse 304, shown in FIG. 8, is applied from read-out pulser 84 through amplifier 94 to the base of the transistor 288, shown in FIG. 7A. The application of pulse 304 to the base of transistor 288 in set gate 93 causes amplifier 290 to become conducting, thus effectively completing the return circuits for the set windings of core translators 74 and 76. In response to the completion of this return path, the direct current voltages applied from the amplifiers associated with the address flip-flops cause a reversal of the remanent magnetization of one of the cores in each of translators 74 and 76. After the reversal of certain cores of the translators, read-out pulser 96 applies a read-out pulse 305 through OR gate 72, shown in FIG. 7A, to the read-out windings of each of the cores in the translators.

In response to the read-out pulse 305 the cores in which the remanent magnetization was reversed by the binary address are returned to their initial condition of magnetization, causing output pulses to be delivered from the output windings of the two selected cores to the magnetic core matrix. These pulses will be coincidentally applied to one of the rows and one of the columns of the magnetic core matrix, and on a basis of the previous assumptions of reversals in cores 270 and 272 of translators 74 and 76, respectively, the output pulses from the translators will appear on row 294 and column 295. Since the pulses will be coincident at only winding 296 and its associated diode 297 of core 261, the remanent magnetization of only core 261 will be reversed.

After pulse 305 causes a transfer of the information from the translators to the magnetic matrix, read-out pulser 100 applies a read-out pulse 306 through OR gate 86, shown in FIG. 7A, to amplifier 292, which is in series with the read-out winding 265 of all the cores in matrix 88. The application of pulse 306 to amplifier 292 causes this amplifier to be conducting and thus deliver a read-out pulse to all the cores of matrices 88 and 90. Since information is only stored in core 261 of matrix 88, the output pulse on winding 259 appears at the starter electrode of amplifier 264. A similar pulse from winding 277 of core 273 will be delivered to the starter electrode of amplifier 274. The resulting simultaneous output pulses from cores 261 and 273 cause gas triode amplifiers 264 and 274 to be ionized. When amplifier 274 ionizes, it transmits a positive voltage 307, shown in FIGS. 7B and 8, to a column connection of gas diode matrix 106. Similarly, when gas triode 264 ionizes, it transmits a negative pulse 312, shown in FIG. 7B, to a row connection of matrix 106. Pulses 307 and 312 will be coincident at only diode 276 and its associated resistor 278.

Pulse 307 is clamped to a predetermined level by clamping diode 320 and its associated clamping bias source 321. Similarly, pulse 312 is clamped by clamping diode 323 and its associated clamping bias source 324. this clamping action assures proper operation of the diode matrix in that it prevents either the positive or the negative pulses from falsely ionizing a diode in the matrix 106, to which diode only one of the pulses is applied.

Coincident complementary pulses 307 and 312 cause gas diode 276 to ionize. When diode 276 ionizes, the potential of the point intermediate diode 276 and resistor 278 rises, and a marking or disconnecting pulse 308, FIG. 8, as the case may be, is transmitted through diode 280 to a terminal connection of the first stage crosspoint diodes connected to the trunk terminal thus marked. This completes the terminal selecting operation. The selector circuit may now be restored to its quiescent condition.

The selector circuit is restored to its quiescent condition by turning off gas tube amplifiers 264 and 274 and diode 276. Amplifier 264 is turned off by a positive pulse 309, FIG. 8, from release pulser 152, which pulser is actuated by flip-flop 151. Amplifier 274 is turned off by a negative pulse from release pulser 150, which pulser is actuated by flip-flop 149. As previously explained, flip-flops 149 and 151 are actuated by the Off "0" pulse on bus 189. When amplifiers 264 and 274 are extinguished, they interrupt the path of sustaining voltage for diode 276, and this diode will be extinguished, thus restoring the selector circuit to its quiescent condition.

*Detailed terminal identifying operation*

In the course of operation within the crosspoint network of establishing and disestablishing paths it is necessary, under three different sets of circumstances, to identify a network terminal. These circumstances comprise the marking of a network terminal by its associated selector circuit, the application of a disconnect pulse to the network terminal by its associated selector circuit, and the application of a pulse to the network terminal on a disconnect from the distant network terminal.

Referring now to FIG. 9, there is disclosed in combined schematic and block form a more detailed representation of the identifying circuitry. The "A" identifier circuit 35 includes four magnetic core translators 135, 137, 139, and 141. As represented in FIG. 2, in block form, "A" identifier 35 includes a resistor matrix, two magnetic core matrices, and four magnetic core translators, together with groups of amplifiers and sequence control circuitry. However, only one identifying circuit is shown schematically in FIG. 9.

This identifying circuitry includes a connection between the "A" identifier 35 and secondary winding 352 of network terminal transformer 353 of a trunk terminal, such as terminal 12. Resistors 355 and 356 are part of matrix 107 and have their mid-points connected to the secondary of transformer 352 and their extreme points connected to a row lead and column lead, respectively. Resistor 355 is connected through its matrix row connection to the input terminal of amplifier 112. The output terminal of amplifier 112 is connected to winding 364 of core 362, which core is part of matrix 116, shown in FIG. 2. Core 362 has two other windings, an output winding 365, which is connected to core translators 139 and 141, and a read-out winding 363 connected between read-out pulser 129 and read-out winding 369 of core 368. The read-out pulser supplies read-out pulses to both cores 362 and 368, as will be subsequently explained. Resistor 356 is connected through a column connection of the resistor matrix to the input of amplifier 110. The output of amplifier 110 is connected to winding 370 of core 368. Output winding 371 of core 368 is connected to core translators 135 and 137 in a manner similar to winding 365 of core 362.

"A" identifier 35 is connected to other portions of the network control circuitry through OR gate 127 and amplifier 375. OR gate 127 has three input leads, one connected to connect order bus 65, another connected to the OFF 300 bus 195, and another connected to release bus 196. The output of amplifier 375 is connected to the input lead of read-out pulser 129 and through delay circuit 133 to the input lead of read-out pulser 134. The output lead of read-out pulser 134 is connected to the read-out windings of each of the cores in translators 135, 137, 139, and 141.

The sequence of operation of the identifying circuitry is as follows. A marking or a disconnecting pulse or a tracing pulse is applied through the semiconductor diode 280 to the selected network terminal, in this instance from diode 276 of the selector diode matrix 106, or a tracing pulse may be applied through diode 282 of the first stage of crosspoints from the distant network terminal of an established path. In either of these three instances the pulse is of the same polarity and magnitude, and advantageously this is a positive pulse. This positive pulse is applied through secondary winding 352 of the network terminal transformer to the mid-point of resistors 355 and 356. This pulse is applied through amplifiers 112 and 110 to the windings 364 and 370, respectively, and will cause the remanent magnetization of cores 362 and 368 to be reversed.

After cores 362 and 368 of matrices 116 and 117, respectively, are reversed by the pulse from the network terminal, a sequence control pulse will be applied to the "A" identifier from other portions of the network control circuitry. If the pulse applied to the network terminal was a marking pulse, then a pulse will be received over the connect order bus 65 to OR logic gate 127, and this pulse will be applied through amplifier 375 to read-out pulser 129. If, however, the pulse applied to the network terminal is the result of a disconnect operation, then a pulse will be applied to the "A" identifier sequence control circuitry through release bus 196. At the conclusion of each connect or disconnect sequence a pulse is applied through OFF 300 bus 195 to OR gate 127.

In response to any one of these three pulses from the other portions of the network control circuitry a pulse is applied through amplifier 375 to read-out pulser 128 and from amplifier 375 through delay circuit 133 to read-out pulser 134. Circuit 133 amplifies and introduces a slight delay and thus causes read-out pulser 134 to be actuated a few microseconds after read-out pulser 129. Advantageously, this delay permits the cores of matrices 116 and 117 to be read out by the application of a pulse from read-out pulser 128, and this information will be transferred to the associated cores of translators 135, 137, 139, and 141. After the information is transferred to the translators, read-out pulser 134 applies a pulse to the read-out windings (not shown) to each of the cores of these translators.

The application of the read-out pulse from pulser 134 causes the information previously stored in the core translators to be delivered over the output leads of the core translators to comparator and indicator circuit 91, shown in FIG. 2. The windings of these identifier translators may be wound and connected in ways known in the art to deliver a binary signal or a "Gray" or reflected binary signal to the comparator and indicator circuit 91. In either arrangement, the comparator and indicator circuit makes available to the office control or switchboard 54 an indication of the verification of the selected network terminal.

It is to be understood that the above-described arrangements are illustrative of the application of the principles of the invention. Numerous other arrangements may be devised by those skilled in the art without departing from the spirit and scope of the invention.

What is claimed is:

1. A communication switching system comprising a distribution network including a plurality of crosspoint devices interconnected between the terminals of the network and bisector means intermediate said terminals, selector means responsive to coded address input signals discrete to said network terminals and an enabling signal, said selector means operative to apply marking potentials to said network terminals in accordance with said coded address input signals, identifier means connected to said terminals and responsive to the application of a marking potential thereto, said identifier means operative to store signal codes discrete to said marked terminal, means for enabling said bisector means sequentially, means for generating a connect order signal, means responsive to said connector order signal for applying said enabling signal to said selector means, means including delay means responsive to said connect order signal for activating said bisector enabling means a specified time after generation of said connect order signal, and means for making a busy test of said network during said specified time.

2. A communication switching system in accordance with claim 1 further comprising means responsive to said connect order signal for clearing out information priorly stored in said identifier means, and means for operating said identifier means subsequently to identify the selected terminal.

3. A communication switching system in accordance with claim 1 wherein said busy test means includes control means connected to said bisector means and enabled by said connect order signal for detecting an increase in current through said bisector means on application of a marking voltage by said selector means to a network terminal and indication means responsive to operation of said control means.

4. A communication switching system in accordance with claim 1 further comprising means for resetting said selector means.

5. A communication switching system in accordance with claim 4 further comprising means connected to said busy test means for applying an enabling signal to said resetting means on actuation of said busy test means.

6. A communication switching system in accordance with claim 4 further comprising time-out means connected to said resetting means and enabled by said connect order signal whereby said resetting means is enabled automatically a predetermined time after operation of said selecting means and means for resetting said time-out means on connection of a communication path through one of said bisector means.

7. A crosspoint distribution network comprising a first and a second group of terminals, crosspoint devices arranged in stages for defining plural paths between said first group terminals and said second group terminals, bisector means intermediate said groups of terminals and connected to said devices, means for generating a connect order signal when a path is to be established through said network, selector means responsive to an enabling signal and to applied address signals for applying marking voltages to selected terminals, means responsive to an enabling signal for enabling said bisector means sequentially, and control means responsive to said connect order signal for providing enabling signals to said selector means and to said bisector enabling means, said control means including delay means whereby said bisector enabling means is enabled after said selector means.

8. A crosspoint distribution network comprising a first and a second group of terminals, crosspoint devices arranged in stages and defining paths between said terminals, bisector means connected to said devices intermediate said first and second group terminals, means for applying marking potentials to said terminals, and means for sequentially enabling said bisector means a predetermined time after said application of marking potentials to said terminals.

9. A crosspoint distribution network comprising a first and a second group of terminals, crosspoint devices defining paths between said first and second group terminals, propagator means connected between certain of said crosspoint devices, bisector means connected to said devices intermediate said first and second group terminals, selector means connected to said first group and said second group of terminals, means for applying distinctive terminal addresses to said selector means, means for simultaneously applying enabling pulses to said selector means and said propagator means, and means for subsequently applying enabling pulses to said bisector means.

10. A crosspoint network in accordance with claim 9 further comprising means connected to said bisector means for detecting the completion of a path through said bisector means, and means responsive to said last-named means for restoring said selector means to their normal conditions after detection of a completed path through one of said bisector means.

11. A crosspoint distribution network comprising a first and a second group of terminals, crosspoint devices defining paths between said first and said second groups of terminals, bisector means connected to said crosspoints intermediate said first and second group terminals, means for generating a connect order signal, timing means for generating an operation-ended signal, selector means for applying marking potentials to said terminals, address means for applying distinctive terminal address input signals to said selector means, means responsive to said connect order signal for sequentially enabling said selector means, said bisector means, and said timing means, and means responsive to said operation-ended signal for resetting said means for generating a connect order signal.

12. A crosspoint distribution network in accordance with claim 11 further comprising operation-successful indicating means, and means responsive to the establishment of a path through said network by one of said bisector means for enabling said operation-successful indicating means.

13. A crosspoint distribution network in accordance with claim 12 further comprising identifier means connected to said network terminals, said identifier means including translating means for generating an address distinctive to each of said terminals, said means responsive to said connect order signal also effective to enable said identifier means after enablement of said selector means and before the termination of the timing period of said timing means.

14. In a crosspoint distribution network having a first and a second group of terminals, crosspoint devices defining plural paths between each of said first group of terminals and each of said second group of terminals, network control means comprising at least one release order pulsing means, selector means connected to one of said groups of terminals for applying disconnect signals to said terminals, and means connected to said selector means and responsive to a signal from said release order pulsing means for controlling the sequence of operation of said selector means.

15. In a crosspoint distribution network in accordance with claim 14 wherein said network control means includes an operation-successful indicating means, said means responsive to a signal from said release order pulsing means including gating means for transmitting an enabling signal pulse to said operation-successful indicating means.

16. In a crosspoint distribution network in accordance with claim 15 wherein said network control means includes operation-ended indicating means, said means responsive to a signal from said release order pulsing means including means for transmitting an enabling signal pulse to said operation-ended indicating means, and means responsive to a signal from said operation-ended indicating means for resetting said release order pulsing means.

17. In a crosspoint distribution network in accordance with claim 16 wherein said network control means includes first and second identifier means connected respectively with said first and said second groups of terminals and wherein said means responsive to a signal from said release order pulsing means includes means for controlling the clearing and reading out of information in said identifiers.

18. A crosspoint distribution network comprising a first and a second group of terminals, a plurality of crosspoint devices arranged in stages and connected between said first and second group of terminals, bisector means connected to said devices intermediate said terminals, first and second selector means connected to said first and second group of terminals, respectively, for applying disconnect signals to distinct terminals in response to terminal addresses applied thereto and distinctive to said terminals and an enabling signal, means for applying said terminal addresses to said selector means, a first and a second pulse source, means responsive to a pulse from said first source for enabling said first selector means, means responsive to a pulse from said second source for enabling said second selector means, first and second identifying means connected to said first and second group terminals, respectively, and means for enabling one of said identifying means connected to one group of terminals subsequent to the enablement of said selector means connected to the other group of terminals, whereby a conducting path may be disconnected by marking only one side of the network, said identifying means indicating the terminal associated with said conducting path at the other side of said network.

19. A crosspoint distribution network in accordance with claim 18 further comprising means responsive to a signal from either of said pulse sources for sequentially applying disabling pulses to said bisector means.

20. A crosspoint distribution network in accordance with claim 19 further comprising operation-successful indicating means and means responsive to deactuation of any of said bisector means for enabling said operation-successful indicating means.

21. A crosspoint distribution network in accordance with claim 19 further comprising operation-ended indicating mean, means including delay means responsive to a signal from either of said pulse sources and to deactuation of one of said bisector means for enabling said operation-ended indicating means, and means for resetting said pulse sources on operation of said-operation-ended indicating means.

22. A control circuit for a crosspoint distribution network having a first and a second group of terminals, crosspoint devices defining plural paths between each of said first group of terminals and each of said second group of terminals, and bisector means intermediate said crosspoints comprising bisector match detector means for detecting an increase in current in said bisector means, connect order means, connect order time-out means, and control means connected to said connect order means and responsive to a signal from said time-out means for restoring said connect order means to a normal condition.

23. A control circuit for a crosspoint distribution network in accordance with claim 22 including bisector enabling means, said control means responsive to a signal from said time-out means including means for disabling said bisector enabling means.

24. A control circuit for a crosspoint distribution network in accordance with claim 23 further including first and second groups of propagator means connected to said crosspoint devices and a first and a second propagator enabling pulse source associated respectively with said first and said second groups of propagator means, said control means including means for turning on said propagator pulse sources in response to a connect order pulse from said connect order means and means for turning off said propagator pulse sources in response to a pulse from said time-out means.

25. A control circuit for a crosspoint distribution network in accordance with claim 24 further including selector means associated respectively with said first and said second groups of terminals, said control means including means for deactuating said selector means in response to a pulse from said time-out means.

26. A control circuit for a crosspoint distribution network in accordance with claim 25 further including first and second identifier means, said control means including means for actuating said identifier means.

27. A crosspoint distribution network comprising a first and a second group of terminals, crosspoint devices connected to define plural paths between each of said first group of terminals and each of said second group of terminals, bisector means intermediate said crosspoints, a bisector release pulse source, a release order pulse source, release time-out means, and control means responsive to a signal from said release order pulse source for enabling said release time-out means.

28. A crosspoint distribution network comprising a first and a second group of terminals, crosspoint devices connected to define plural paths between each of said first group of terminals and each of said second group of terminals, bisector means intermediate said crosspoints, propagator means connected to said crosspoint devices, selector means connected to said terminals, propagator pulsing means, selector pulsing means, a connect order pulse source, connect order time-out means, means directly responsive to the operation of said time-out means for resetting said propagator pulsing means, and means including first delay means connected to said time-out means for delaying the application of a reset pulse from said selector pulsing means to said selector means.

29. A crosspoint distribution network in accordance with claim 28 further including identifier means connected to said terminals and second delay means connected intermediate said identifier means and said first delay means for controlling the application of resetting pulses to said identifier means after the application of resetting pulses to said propagator and said selector means.

30. A crosspoint distribution network in accordance with claim 29 further comprising an operation-ended indicating means, means including third delay means responsive to a pulse from said second delay means and to a connect order pulse from said connect order pulse source for operating said operation-ended indicating means, and means responsive to said operation-ended indicating means for resetting said connect order pulse source.

References Cited in the file of this patent

UNITED STATES PATENTS

| | | |
|---|---|---|
| 2,294,237 | McKim | Aug. 25, 1942 |
| 2,590,262 | McAlpine | Mar. 25, 1952 |
| 2,600,502 | Holden | June 17, 1952 |
| 2,667,542 | Wright | Jan. 26, 1954 |